(12) United States Patent
Annadata et al.

(10) Patent No.: US 7,308,093 B2
(45) Date of Patent: *Dec. 11, 2007

(54) SYSTEM AND METHOD FOR MULTI-CHANNEL COMMUNICATION QUEUING USING ROUTING AND ESCALATION RULES

(75) Inventors: Anil Kumar Annadata, Milpitas, CA (US); Wai Hong Pak, Hercules, CA (US); Rohit Bedi, Hayward, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/515,604

(22) Filed: Sep. 5, 2006

(65) Prior Publication Data

US 2007/0121578 A1 May 31, 2007

Related U.S. Application Data

(63) Continuation of application No. 09/895,456, filed on Jun. 29, 2001, now Pat. No. 7,103,171.

(51) Int. Cl.
*H04M 3/00* (2006.01)
(52) U.S. Cl. ............................ 379/265.12; 379/265.01; 379/265.09; 379/266.1; 379/221.06; 709/202; 709/219; 709/223; 709/226
(58) Field of Classification Search ........... 379/265.12, 379/265.01, 265.09, 266.1, 221.06; 709/202, 709/219, 223, 226
See application file for complete search history.

(56) References Cited

U.S. PATENT DOCUMENTS 5,287,102 A 2/1994 McKiel, Jr. ............ 340/825.19

(Continued)

FOREIGN PATENT DOCUMENTS

EP 1113656 7/2001 ............... 3/523

(Continued)

OTHER PUBLICATIONS

Schmidt, et al., Experiences with an Object-Oriented Architecture for Developing Dynamically Extensible Distributed System Management Software, Nov. 28-Dec. 2, 1994, pp. 500-506.

(Continued)

*Primary Examiner*—Quynh H. Nguyen
(74) *Attorney, Agent, or Firm*—Campbell Stephenson LLP

(57) ABSTRACT

A system, apparatus, and method for routing work items to agents, wherein the work items can be of one of two or more different communication media types from one of two or more different communication channels. A queuing engine includes a list of routes and each route is associated with one or more properties. The list of routes can further include information related to one or more escalation rules for each route; the type of communication media available along the route for handling one or more of the work items; whether the route is active; the priority of the route; whether work items can be handled real-time; the service level for work items handled on the route; and the number of work items that can be assigned to the route. The queuing engine determines various properties required to handle each work item, such as the communication media type, agent language and skill level, and the category and recipient of the work item, and assigns each work item to one of the one or more agents based on one or more of the properties. When the queuing engine determines that a work item has been waiting a predetermined amount of time to be assigned to an agent, the queuing engine can escalate the search for an agent to handle the work item based on the escalation rules. The queuing engine can also substitute values for variables in the routing and escalation rules, thereby reducing the number of rules that must be entered to achieve the same routing capability.

20 Claims, 20 Drawing Sheets

U.S. PATENT DOCUMENTS

| | | | |
|---|---|---|---|
| 5,506,898 A | 4/1996 | Costantini et al. | 379/266 |
| 5,524,147 A | 6/1996 | Bean | 379/265 |
| 5,555,365 A | 9/1996 | Selby et al. | 395/159 |
| 5,594,791 A | 1/1997 | Szlam et al. | 379/265 |
| 5,699,361 A | 12/1997 | Ding et al. | 370/431 |
| 5,715,412 A | 2/1998 | Aritsuka et al. | 395/326 |
| 5,734,852 A | 3/1998 | Zias et al. | 395/334 |
| 5,754,830 A | 5/1998 | Butts et al. | 395/500 |
| 5,805,886 A | 9/1998 | Skarbo et al. | 395/685 |
| 5,828,882 A | 10/1998 | Hinckley | 395/680 |
| 5,884,032 A | 3/1999 | Bateman et al. | 395/200.34 |
| 5,894,512 A | 4/1999 | Zenner | 379/265 |
| 5,905,879 A | 5/1999 | Lambrecht | 395/297 |
| 5,915,011 A | 6/1999 | Miloslavsky | 379/219 |
| 5,946,399 A | 8/1999 | Kitaj et al. | 380/49 |
| 5,961,620 A | 10/1999 | Trent et al. | 710/105 |
| 5,964,836 A | 10/1999 | Rowe et al. | 709/221 |
| 5,983,019 A | 11/1999 | Davidson | 395/705 |
| 5,983,184 A | 11/1999 | Noguchi | 704/270 |
| 6,058,435 A | 5/2000 | Sassin et al. | 709/305 |
| 6,064,730 A | 5/2000 | Ginsberg | 379/265 |
| 6,092,102 A | 7/2000 | Wagner | 709/206 |
| 6,108,695 A | 8/2000 | Chawla | 709/217 |
| 6,111,562 A | 8/2000 | Downs et al. | 345/145 |
| 6,118,899 A | 9/2000 | Bloomfield et al. | 371/233 |
| 6,134,318 A | 10/2000 | O'Neil | 379/266 |
| 6,138,158 A | 10/2000 | Boyle et al. | 709/225 |
| 6,154,209 A | 11/2000 | Naughton et al. | 345/339 |
| 6,175,564 B1 | 1/2001 | Miloslavsky et al. | 370/352 |
| 6,199,104 B1 | 3/2001 | Delph | 709/208 |
| 6,243,452 B1 | 6/2001 | O'Shaughnessey et al. | 379/201 |
| 6,263,066 B1 | 7/2001 | Shtivelman et al. | 379/266 |
| 6,300,947 B1 | 10/2001 | Kanevsky | 345/333 |
| 6,314,451 B1 | 11/2001 | Landsman et al. | 709/203 |
| 6,332,154 B2 | 12/2001 | Beck et al. | 709/204 |
| 6,389,132 B1 | 5/2002 | Price | 379/265.01 |
| 6,393,475 B1 | 5/2002 | Leong et al. | 709/223 |
| 6,449,260 B1 | 9/2002 | Sassin et al. | 370/270 |
| 6,449,646 B1 | 9/2002 | Sikora et al. | 709/226 |
| 6,463,292 B1 | 10/2002 | Rahman | 455/466 |
| 6,480,600 B1 | 11/2002 | Neyman et al. | 379/265.09 |
| 6,486,892 B1 | 11/2002 | Stern | 345/760 |
| 6,489,951 B1 | 12/2002 | Wong et al. | 345/173 |
| 6,493,695 B1 | 12/2002 | Pickering et al. | 706/47 |
| 6,493,760 B1 | 12/2002 | Pendlebury et al. | 709/229 |
| 6,507,868 B2 | 1/2003 | Simmon et al. | 709/219 |
| 6,587,556 B1 | 7/2003 | Judkins et al. | 379/219 |
| 6,681,010 B1 | 1/2004 | Anderson et al. | 379/265.11 |
| 6,690,788 B1 | 2/2004 | Bauer et al. | 379/242 |
| 6,694,352 B1 | 2/2004 | Omoigui | 709/205 |
| 6,704,409 B1 | 3/2004 | Dilip et al. | 379/265.02 |
| 6,718,370 B1 | 4/2004 | Coffman et al. | 709/212 |
| 6,718,393 B1 | 4/2004 | Aditya | 709/239 |
| 6,744,878 B1 | 6/2004 | Komissarchik et al. | 379/265.03 |
| 6,763,384 B1 | 7/2004 | Gupta et al. | 709/224 |
| 6,771,765 B1 | 8/2004 | Crowther et al. | 379/265.09 |
| 6,816,880 B1 | 11/2004 | Strandberg et al. | 709/202 |
| 6,832,203 B1 | 12/2004 | Villena et al. | 705/8 |
| 6,879,586 B2 | 4/2005 | Miloslavsky et al. | 370/356 |
| 6,889,337 B1 | 5/2005 | Yee | 714/1 |
| 6,895,558 B1 | 5/2005 | Loveland | 715/746 |
| 6,963,783 B1 | 11/2005 | Bi et al. | 700/94 |
| 6,978,311 B1 | 12/2005 | Netzer et al. | 709/232 |
| 7,093,199 B2 | 8/2006 | Cragun et al. | 715/763 |
| 2002/0026335 A1 | 2/2002 | Honda | 705/4 |
| 2002/0032809 A1 | 3/2002 | Bateman et al. | 710/5 |
| 2002/0042845 A1 | 4/2002 | Burmann et al. | 709/249 |
| 2002/0122053 A1 | 9/2002 | Dutta et al. | 345/729 |
| 2002/0144233 A1 | 10/2002 | Chong et al. | 717/105 |
| 2003/0009520 A1 | 1/2003 | Nourbakhsh et al. | 709/204 |
| 2003/0014598 A1 | 1/2003 | Brown | 711/141 |
| 2003/0018702 A1 | 1/2003 | Broughton et al. | 709/202 |
| 2003/0093533 A1 | 5/2003 | Ezerzer et al. | 709/227 |
| 2003/0164848 A1 | 9/2003 | Dutta et al. | 345/729 |
| 2005/0003812 A1 | 1/2005 | Gladwin et al. | 455/426.1 |
| 2005/0010526 A1 | 1/2005 | Takahashi et al. | 705/44 |

FOREIGN PATENT DOCUMENTS

| | | |
|---|---|---|
| WO | WO 97/16014 | 5/1997 |
| WO | WO 97/42728 | 11/1997 |
| WO | WO 00/49778 | 8/2000 |

OTHER PUBLICATIONS

International Search Report as mailed from the PCT on Feb. 28, 2003 for co-related WO Application (PCT/US02/31152; Filed Sep. 30, 2002), 5 pages.

International Search Report as mailed from the PCT on Jul. 12, 2002, for International Application No. PCT/US02/09879, 4 pages.

FIG. 4A: TABLE UQ_CFG

| Column_Name | Type | Length | Comments |
|---|---|---|---|
| NAME | Varchar | 75 | |
| SERVER_NAME | Varchar | 75 | |
| SERVER_PORT | Number | 10 | |
| RECEIVER_NAME | Varchar | 75 | |
| RECEIVER_PORT | Number | 10 | |

FIG. 4B: TABLE UQ_CFG_PARAM

| Column_Name | Type | Length | Comments |
|---|---|---|---|
| UQ_CFG_ID | Varchar | 15 | |
| NAME | Varchar | 50 | |
| VALUE | Varchar | 50 | |

FIG. 4C: TABLE UQ_ROUTERULES

| Column Name | Type | Length | Comments |
|---|---|---|---|
| Rule ID | VarChar | 75 | User defined name of the route |
| PRIORITY_CD | Varchar | 30 | Lower the value, higher the priority |
| MEDIA_TYPE_CD | VarChar | 30 | Select from list of values including "PBX", "Web Chat", "Web Collaboration", "Fax", "E-Mail" |
| MEDIA_SERVICE_LEVEL | Number | 10 | The number of seconds by which the majority of the work items need to be handled for a media type to which the routing rule corresponds |
| ACTIVE_FLG | Char | 1 | Indicates whether the route is active or not. If the route is not active, information for this route will not be passed to UQ engine |
| SERVICE_LEVEL | Number | 10 | The number of seconds by which the majority of the work items need to be handled in the route |
| CAPACITY | Number | 10 | Maximum capacity of this route. Alarm is raised when the number of queued item exceeds the CAPACITY |
| SELECTION CRITERIA | Char | 1 | |
| IsContact | Boolean | | |
| TIME_OUT_SCND | Number | 10 | Time is second in which when the work item is not server, the first escalation rule will be effective |
| RouteToUnavailable | Boolean | 1 | Can a workitem in this route be routed to an agent who is not available? |

FIG. 4D: TABLE UQ_ROUTE_PROP

| Column Name | Type | Length | Comments |
|---|---|---|---|
| UQ_ROUTE_ID | Varchar | 15 | |
| NAME | Varchar | 75 | Name of the property |
| VALUE | Varchar | 75 | Value of the property |

FIG. 4E: TABLE UQ_ROUTE_ESCL

| Column Name | Type | Length | Comments |
|---|---|---|---|
| UQ_ROUTE_ID | Varchar | 15 | |
| NAME | Varchar | 75 | Name of the escalation rules |
| TIME_OUT_SCND | Number | 10 | Time in seconds in which the escalation rule will be timed out. Zero time means waiting indefinitely. |
| SEQ_NUM | Number | 10 | Order of escalation rules |

FIG. 4F: TABLE UQ_RTESCL_RUL

| Column Name | Type | Length | Comments |
|---|---|---|---|
| ROUTE_ESCL_ID | Varchar | 15 | |
| SKILL_NAME | Varchar | 50 | Skill |
| SKILL_ITEM | Varchar | 50 | Name of skill items. For example "English" for Language skill. If skill item is null, it is a substitution of language from the work item data property. This is typically used when different rules for different languages are not required. Languages can be retrieved from the work item data property. |
| EXPERTISE | Varchar | 30 | Level of skill is chosen from a list of values, for example:<br><br>3=EXPERT<br>2=INTERMEDIATE<br>1=NOVICE<br>0=NO_SKILL |

FIG. 4G: TABLE UQ_SKL_MAP

| Column Name | Type | Length | Comments |
|---|---|---|---|
| ROUTE_PROP_NAME | Varchar | 75 | Route property name |
| ROUTE_PROP_VALUE | Varchar | 75 | Route property value |
| SKILL_NAME | Varchar | 75 | Skill name |
| SKILL_VALUE | Varchar | 75 | Skill value |

FIG. 4H: TABLE UQ_USER_MEDIA

| Column Name | Type | Length | Comments |
|---|---|---|---|
| USER_ID | Varchar | 15 | Agent number |
| MEDIA_TYPE_CD | Varchar | 30 | Type of media |
| MAX_NUM_SESSIONS | Number | 10 | Maximum sessions of this media type allowed for this agent. |

FIG. 4I: TABLE UQ_ROUTE_STS

| Column_Name | Type | Length | Comments |
|---|---|---|---|
| ROUTE_ID | Varchar | 75 | |
| START_TS | Date Time | | Start time |
| END_TS | Date Time | | End time |
| SOURCE_NAME | Varchar | 75 | The route name |
| AVG_WAIT_TM | Number | 10 | Waiting time during the given period |
| AVG_HANDLE_TM | Number | 10 | Handling time during the period |
| NUM_ABANDONED_REQS | Number | 10 | Number of abandoned requests |
| AVG_ABANDONING_TM | Number | 10 | Average time until request is abandoned |
| LONGEST_WAIT_TM | Number | 10 | Longest waiting time in seconds |
| AVAIL_USER_PCT | Number | 10 | Percentage of available agents |
| AUX_WORK_USER_PCT | Number | 10 | Percentage of auxwork agents |
| TOTAL_NUM_WORKITEMS | Number | 10 | Total number work items |
| TOTAL_NUM_UNASSIGNED_WORKITEMS | Number | | Total number of unassigned work items. |
| TOTAL_NUM_DELIVERED_WORKITEM | Number | | Total number of delivered work items. |
| TOTAL_NUM_SERVICE_LEVEL_WORKITEM | Number | | Total number of service level work items. |
| Comments | Varchar | 250 | |

FIG. 4J: TABLE UQ_MEDIA_STS

| Column Name | Type | Length | Comments |
|---|---|---|---|
| MEDIA_TYPE_CD | Varchar | 30 | |
| START_TS | Date Time | | |
| END_TS | Date Time | | |
| SOURCE_NAME | Varchar | 75 | Either the route name |
| AVG_WAIT_TM | Number | 10 | Waiting time during the given period |
| AVG_HANDLE_TM | Number | 10 | Handling time during the period |
| NUM_ABANDONED_REQS | Number | 10 | Number of abandon requests |
| AVG_ABANDONING_TM | Number | 10 | |
| LONGEST_WAIT_TM | Number | 10 | Longest waiting time in seconds |
| AVAIL_USER_PCT | Number | 10 | Percentage of available agents |
| AUX_WORK_USER_PCT | Number | 10 | Percentage of auxwork agents |
| TOTAL_NUM_WORKITEMS | Number | 10 | Total number of agents if each agent handles only one work item |
| TOTAL_NUM_UNASSIGNED_WORKITEM | Number | | |
| TOTAL_NUM_DELIVERED_WORKITEM | Number | | |
| TOTAL_NUM_SERVICE_LEVEL_WORKITEM | Number | | |
| Comments | Varchar | 250 | |

FIG. 4K: TABLE UQ_AGENT_STS

| Column Name | Type | Length | Comments |
|---|---|---|---|
| USER_ID | Varchar | 15 | |
| START_TS | Date Time | 7 | |
| END_TS | Date Time | 7 | |
| CONTACT_ID | Varchar | 15 | |
| AVAIL_PCT | Number | | Percentage available |
| BUSY_PCT | Number | | Percentage busy |
| AUX_WORK_PCT | Number | | Percentage auxwork |
| NUM_COMM_ITEM_SRVD | Number | | Number of work item served |
| Comments | Varchar | 250 | |

FIG. 4L: TABLE UQ_ERR_LOG

| Column Name Name | Type | Length | Comments |
|---|---|---|---|
| TYPE_CD | DateTime | 7 | |
| Severity | Varchar | 30 | Either alarm or error |
| ERROR_CODE | Varchar | 30 | |
| MSG_DESC | Varchar | 10 | Alarm code or error code |
| | Varchar | 250 | Template for message |

FIG. 4M: S_JOURNAL

| Column Name | Type | Length | Comments |
|---|---|---|---|
| WORK ITEM ID | Varchar | 250 | Work item ID |
| ROUTE_NAME | Varchar | 75 | The name of the route. Use the actual name instead of ID because the nature of the route could be changing from time to time. |

FIG. 4N: S_JOURNAL_WORKITEM_PROPERTY

| Column Name | Type | Length | Comments |
|---|---|---|---|
| JOURNAL_ID | Varchar | 15 | |
| Name | Varchar | 75 | Name of the property |
| Value | Varchar | 75 | Value of the property |

FIG. 4O: S_JOURNAL_ESC_HIST

| Column Name | Type | Length | Comments |
|---|---|---|---|
| JOURNAL_ID | Varchar | 15 | |
| ESC_STEP_NAME | Varchar | 75 | |
| START_TIME | Date Time | | Start time |
| END_TIME | Date Time | | |
| RESULT | Varchar | 75 | |

FIG. 4P: S_JOURNAL_STATE_HIST

| Column_Name | Type | Length | Comments |
|---|---|---|---|
| JOURNAL_ID | Varchar | 15 | |
| USERID | Varchar | 15 | |
| START_TIME | Date Time | | Start time |
| END_TIME | Date Time | | |
| AGENTSTATE | Varchar | 50 | |
| REASON | Varchar | 50 | |

FIG. 4T

SYSTEM AND METHOD FOR MULTI-CHANNEL COMMUNICATION QUEUING USING ROUTING AND ESCALATION RULES

CROSS REFERENCE TO RELATED APPLICATIONS

This application is a continuation of U.S. patent application Ser. No. 09/895,456, entitled "SYSTEM AND METHOD FOR MULTI-CHANNEL COMMUNICATION QUEUING USING ROUTING AND ESCALATION RULES", filed Jun. 29, 2001 now U.S. Pat. No. 7,103,171, and naming Anil Kumar Annadata, Wai Hong Pak and Rohit Bedi as inventors. This application is assigned to Siebel Systems, Inc., the assignee of the present invention, and is hereby incorporated by reference, in its entirety and for all purposes.

The present invention is related to the subject matter of the following non-provisional United States Patent Applications:

"Adaptive Communication Application Programming Interface," naming inventors Mingtse Chen, Anil K. Annadata, and Leon Chan, filed Mar. 31, 2001, Ser. No. 09/823,828.

"System and Method for Maintaining Real-Time Agent Information for Multi-Channel Communication Queuing," naming inventors Mingtse Chen, Anil K. Annadata, and Wai H. Pak, filed Mar. 31, 2001, Ser. No. 09/823,770.

"System and Method for Multi-Channel Communication Queuing," naming inventors Anil K. Annadata, Wai H. Pak, and Rohit Bedi, filed Mar. 31, 2001, Ser. No. 09/823,590.

"Configurable Media-independent Server," naming inventors Mingtse Chen and Anil K. Annadata, Filed Mar. 31, 2001, Ser. No. 09/823,769.

"User Interface for Multi-Channel Communication," naming inventors Mingtse Chen, Anil K. Annadata, and Kuang Huang, filed Mar. 31, 2001, Ser. No. 09/823,531.

"Multi-Channel Media Independent Server," naming inventors Mingtse Chen, Anil K. Annadata, and Leon Chan, filed Mar. 31, 2001, Ser. No. 09/823,835.

"An Extensible Interface for Inter-Module Communication," naming inventor Wai H. Pak, filed Mar. 31, 2001, Ser. No. 09/823,678.

each of which is herein incorporated by reference in its entirety.

BACKGROUND

In today's emerging technological and information world, companies are interacting with their customers, potential customers and other contacts through a wide variety of different communication channels. Such communication channels include face-to-face, telephone, fax, email, voicemails, wireless communication, Internet information inquiries via call me now and call me later, Internet collaborative sessions, paging and short messaging services. With all these communication channels, companies are faced with managing each customer interaction while meeting service levels and maximizing customer satisfaction. In addition, companies are faced with optimally staffing and training their workforce to deal with customers through these communication channels whether through their customer support center(s), telebusiness organizations, or their sales, marketing, and service professionals.

Currently, many companies have dedicated email inboxes, fax inboxes, and voicemail boxes defined for specific business areas as well as automated call distributors. Employees called agents are assigned to poll and manage the support requests from customers for each communication channel. Combined with the traditional call queues for inbound telephone calls, each agent is tasked with managing his or her work using all these communication channels while not having any visibility to the queue status and priorities of each customer support request and/or communication channel.

Thus, it is desirable to provide a system that includes a universal queue strategy capable of assigning, routing, and queuing work items from multiple channels of communication to an agent having the appropriate skills to respond to the request. The system should enable the agent to view and manage his or her work items for all communication channels. Such a system reduces the response times and increases customer satisfaction, while balancing priorities amongst work items in multiple communication channels.

SUMMARY

In one embodiment, a method of routing work items in a multi-channel communication queuing system is provided that includes forming a list of routes, wherein each route includes information related to the type of communication media available along the route for handling one or more of the work items.

In one aspect of this embodiment, each route can further include information indicating whether the route is active, the priority of the route, whether work items can be handled real-time, the service level for work items handled on the route, and the number of work items that can be assigned to the route.

Another aspect of this embodiment can include entering one or more properties for the route, combining two or more of the properties of the route using a boolean operator, and substituting a value for a variable in one or more of the properties.

Another aspect of this embodiment can include entering one or more escalation rules for the route, combining two or more of the escalation rules using a boolean operator, and substituting a value for a variable in one or more of the escalation rules.

In another embodiment, a database structure for a multi-channel communication queuing system includes a list of routes that includes information related to properties for the routes, and escalation rules for the routes.

Another aspect of this embodiment can include information related to the type of communication media available along the route for handling one or more of the work items; whether the route is active; the priority of the route; whether work items can be handled real-time; the service level for work items handled on the route; and the number of work items that can be assigned to the route.

In another embodiment, a system for routing work items to agents is provided. The work items can be of one of two or more different communication media types from two or more different communication channels. The system includes a queuing engine with a list of routes and information related to one or more properties for each route rising.

In one aspect of this embodiment, the list of routes further includes information related to one or more escalation rules for the route.

In another aspect of this embodiment, the list of routes further includes information related to the type of communication media available along the route for handling one or more of the work items.

In another aspect of this embodiment, the list of routes further includes information related to one or more of the following types of information: whether the route is active; the priority of the route; whether work items can be handled real-time; the service level for work items handled on the route; and the number of work items that can be assigned to the route.

In another aspect of this embodiment, the queuing engine is operable to determine the communication media type required to handle each work item, and to assign each work item to one of the one or more agents based on the communication media type.

In another aspect of this embodiment, the queuing engine is operable to determine the language required to handle each work item, and to assign each work item to one of the one or more agents based on the language required.

In another aspect of this embodiment, the queuing engine is operable to determine the level of agent skill required to handle each work item, and to assign each work item to one of the one or more agents based on the level of skill required.

In another aspect of this embodiment, the queuing engine is operable to determine a category for each work item, and to assign each work item to one of the one or more agents based on the category of the work item.

In another aspect of this embodiment, the queuing engine is operable to determine a recipient for each work item, and to assign each work item to one of the one or more agents based on the recipient of the work item.

In another aspect of this embodiment, the queuing engine is operable to determine the amount of time that a work item has been waiting to be assigned to an agent, and to escalate the search for an agent to handle the work item based on the escalation rules.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 4a through 4p show examples of tables in a universal queuing database in accordance with the present invention.

FIG. 4r is an example of an administrator's interface for entering escalation rules for a route.

The use of the same reference symbols in different drawings indicates similar or identical items.

DETAILED DESCRIPTION

FIGS. 1A-1D are diagrams of one embodiment of a client/server system 100 that can utilize the present invention for enabling agents to respond to customer support requests and/or information requests via multiple communication channels of different media types. These media types include, but are not limited to, telephone, email, fax, web collaboration, Internet call me now and call me later, web chat, wireless access protocol, paging, and short messaging services. The term customer is used herein to include individuals and contact persons at businesses that are customers of the company, potential customers and other persons with whom a customer support agent communicates. Such a client/server system 100 is further described in "System and Method for Multi-Channel Communication Queuing," naming inventors Anil K. Annadata, Wai H. Pak, and Rohit Bedi, filed Mar. 31, 2001, Ser. No. 09/823,590.

Figure 1A:
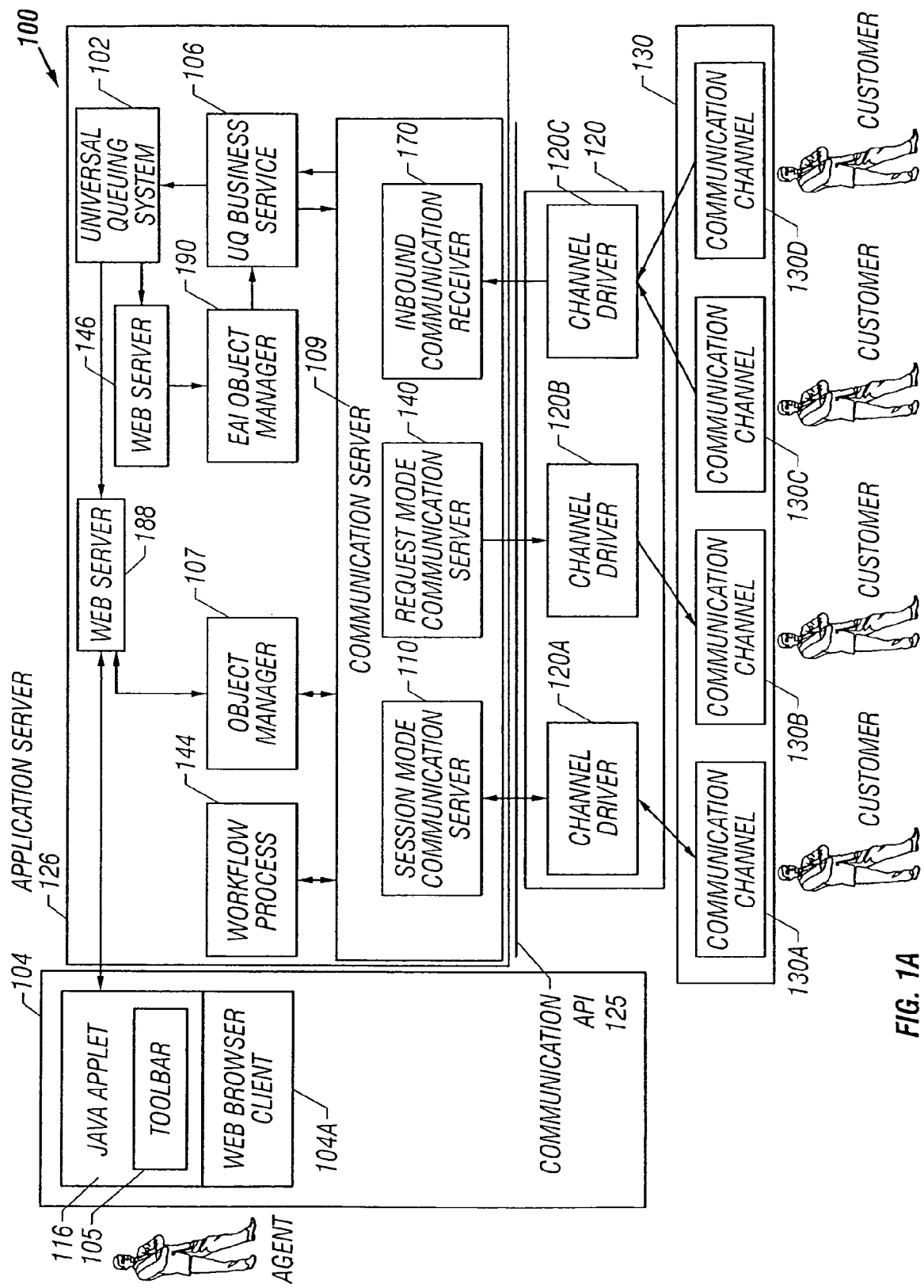
FIGS. 1A through 1D are a diagram of one embodiment of a system for enabling and scheduling agents to respond to customer support requests and/or information requests via multiple communication channels of different media types.

FIG. 1A shows that four customers have submitted customer support requests to the client/server system 100 and three agents are responding to customer support requests. The four customers submitted the customer support requests via four communication channels 130, such as communication channels 130A, 130B, 130C, and 130D. In one embodiment, at least two of the four communication channels support different media types.

In accordance with the present invention, client/server system 100 includes a universal queuing (UQ) system 102 capable of assigning, routing, and queuing work items from multiple channels of communication to an agent having the appropriate skills to respond to a customer support request. The term work item refers to a request from a customer that requires a response from an agent assigned by client/server system 100, such as responding to a customer support request in the form of a telephone call, email, fax or other communication of a different media type. A work item can be initiated when an event such as an incoming customer support request arrives or by an application client using the communication API 125.

Client/server system 100 also includes a communication server 109 that enables agents to use communication channels of different media types to communicate with customers. Communication server 109 handles events such as the arrival of incoming customer support requests from a channel driver 120 such as one of channel drivers 120A, 120B, and 120C. Each channel driver 120 communicates with a communication channel 130 such as one of communication channels 130A, 130B, 130C and 130D.

Interaction between UQ system 102 and communication server 109 occurs when, for example, communication server 109 receives and routes an incoming customer request as a work item to UQ system 102 for assignment to an agent. UQ system 102 assigns an agent to the work item and sends the work item back to communication server 109 for communication to the assigned agent.

Web browser client 104A includes a web browser program such as Microsoft's Internet Explorer running on a client computer system (not shown). The web browser client 104A communicates with a web server 188. Application server 126 in client/server system 100 performs functions for and sends information to web browser client 104A via web server 188, which provides web pages for web browser client 104A to display. Web server 188 can download program instructions, such as Java applet 116, to the web browser client 104A to provide additional functionality, such as a user interface.

Web browser client 104A is shown including a toolbar 105. One of skill in the art will recognize that other user interfaces providing the functionality of toolbar 105 can be implemented using a variety of different display formats to interface with multiple communication channels of different media types within the scope of the invention. Toolbar 105 is presented as part of a user interface. One embodiment of toolbar 105 is disclosed in U.S. patent application Ser. No. 09/823,531 "User Interface for Multi-Channel Communication."

In one embodiment, application server 126 of client/server system 100 includes object manager 107, session mode communication server 110, request mode communication server 140, inbound communication receiver 170, UQ system 102, web server 188, web server 146, Enterprise Application Interface (EAI) object manager 190, and workflow process 144. In one embodiment, communication between components in application server 126 is enabled using a suitable inter-process communication protocol in conjunction with transfer control protocol/Internet protocol (TCP/IP) as known in the art.

UQ business service 106 allows communication server 109 to request information from UQ system 102, which returns the information via web server 146, and EAI object manager 190. In one embodiment, both session mode communication server 110 and inbound communication receiver 170 can communicate with UQ system 102. Other embodiments can communicate with a third party queuing system for maintaining work item queues and assigning agents to work items.

Communication server 109 includes session mode communication server 110. Communication server 109 may optionally include one or both of request mode communication server 140 and inbound communication receiver 170. It is important to note that the functionality provided by servers 110, 140, and 170 can be implemented on one server computer system or distributed across two or more server computer systems. Communication server 109 handles all communication between agents and customers via communication channels 130 of one or more media types. Communication server 109 is not media-specific and has no knowledge of communication channels or media.

To communicate with multiple communication channels of different media types, communication server 109 is designed to communicate with a channel driver 120 such as one of channel drivers 120A, 120B, and 120C. A channel driver 120 is written according to Communication Application Program Interface (API) 125. Communication API 125 provides an interface for third party vendors of communication devices and software (e.g., middleware vendors for communication devices) to provide a channel driver 120 so that their products are compatible with application server 126. By implementing a channel driver 120, vendors can take advantage of the customer support center management features and multi-media communication channel capabilities of application server 126.

Communication API 125 is designed to provide flexibility to third party vendors for integrating their products. In the implementation of a channel driver, a vendor defines the commands the vendor's communication channel 130 understands so that communication server 109 can issue commands for the communication channel 130 to perform. Normally these commands are issued when session mode communication server 110 is presenting a user interface to the agent, although inbound communication receiver 170 also can send commands in some circumstances.

In addition, the vendor defines the events that the vendor's communication channel 130 provides regarding activity of a specific communication channel 130. Finally, the vendor provides a channel driver 120 implementation, such as a dynamic link library (.DLL file), for performing each command and generating and providing each event. The channel driver 120 implementation is required by communication API 125 to include code to instantiate a driver object and at least one service object.

By requiring the vendor to provide facilities for the communication server 109 to issue commands to and to receive information from the vendor's communication channel 130, communications API 125 enables communications server 109 to operate independently of the command channel 130 media type and specific protocols to communicate with the vendor's communication device or software.

Each event handler corresponds to an event provided by channel driver 120 and it is sequenced among the event handlers for an event. Each event handler has an event response. An event response can be shared among event handlers. An event response can have multiple event logs, and an event log can be shared among event responses. When operating in session mode, communication server 109 is under the control of session mode communication server 110. Session mode communication server 110 receives incoming events such as customer support requests and communicates in real time with the agent by controlling a user interface presented to the agent. The term real time is used herein to indicate that the incoming customer support request is communicated to the agent at substantially the same time the customer support request is received by the communication channel, with brief intermissions only to allow for processing and transport time in transporting the customer support request. The term toolbar 105 as used herein includes the user interface within which the communication toolbar 105 is presented.

When an event such as arrival of an incoming telephone call occurs, the user interface notifies the agent using a notification function to change the user interface to capture the agent's attention. For example, a notification function can cause a button to blink to notify the agent of the phone call. A notification function can also display other information such as information about the caller before the agent picks up the phone. When the agent uses toolbar 105 to accept a telephone call, put a call on hold, or release a call, the user interface sends a command to session mode communication server 110, which communicates with one of channel drivers 120 to issue the command to the communication channel controlling the telephone.

Figures 1, 2:
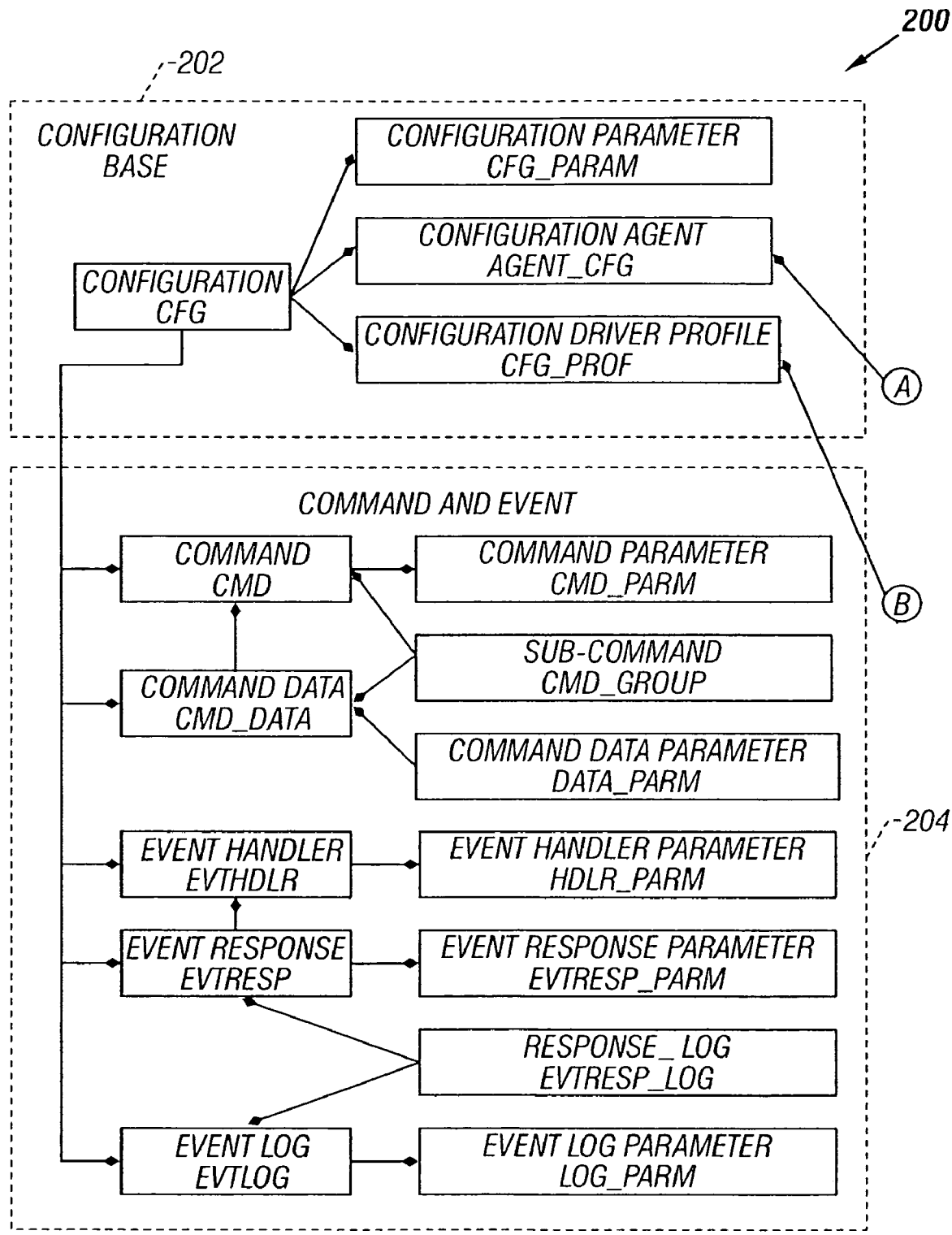
FIG. 2 shows an example of a database scheme for the system of FIGS. 1A through 1D.
Figure 2:
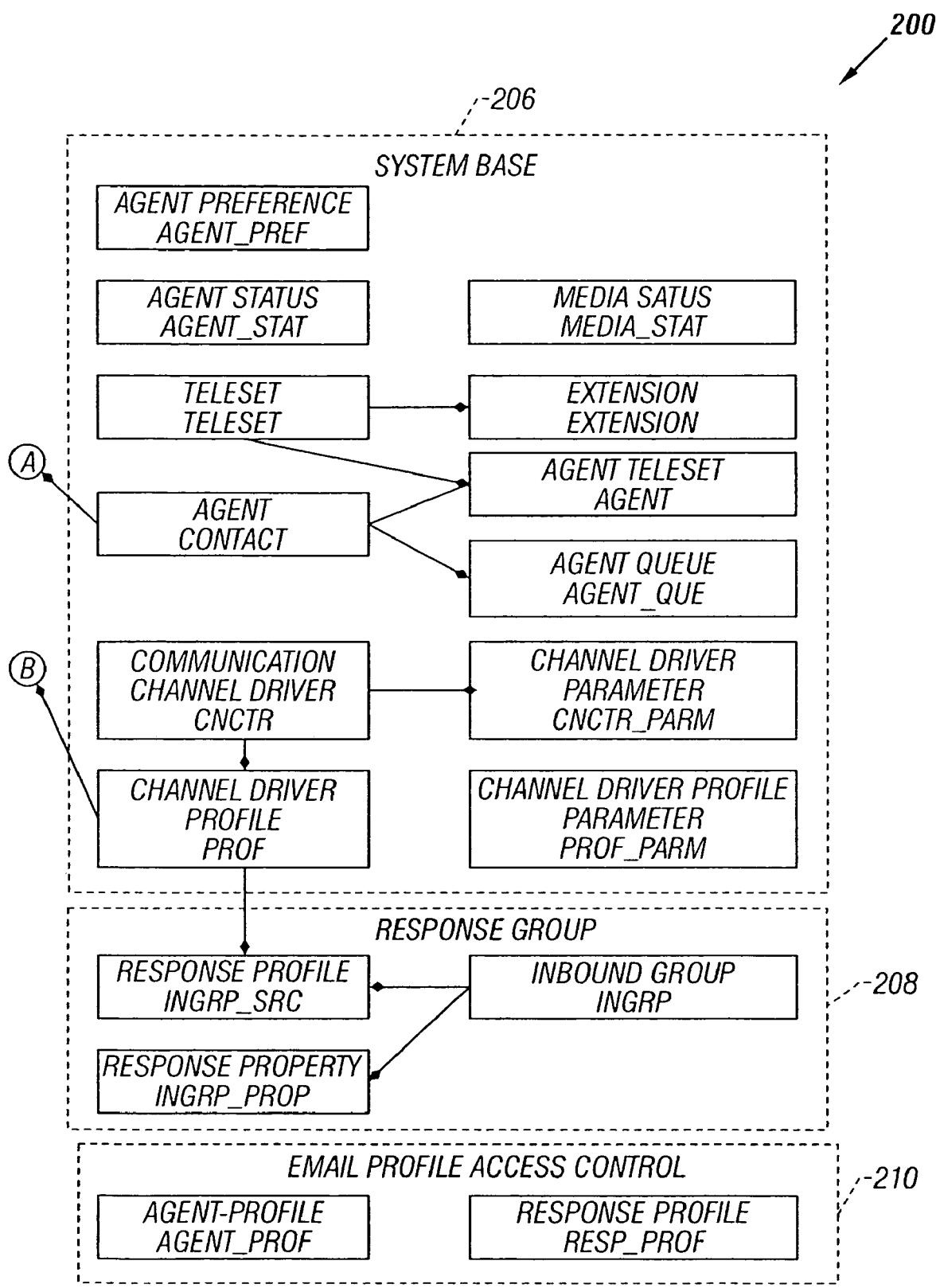
Figure 3:
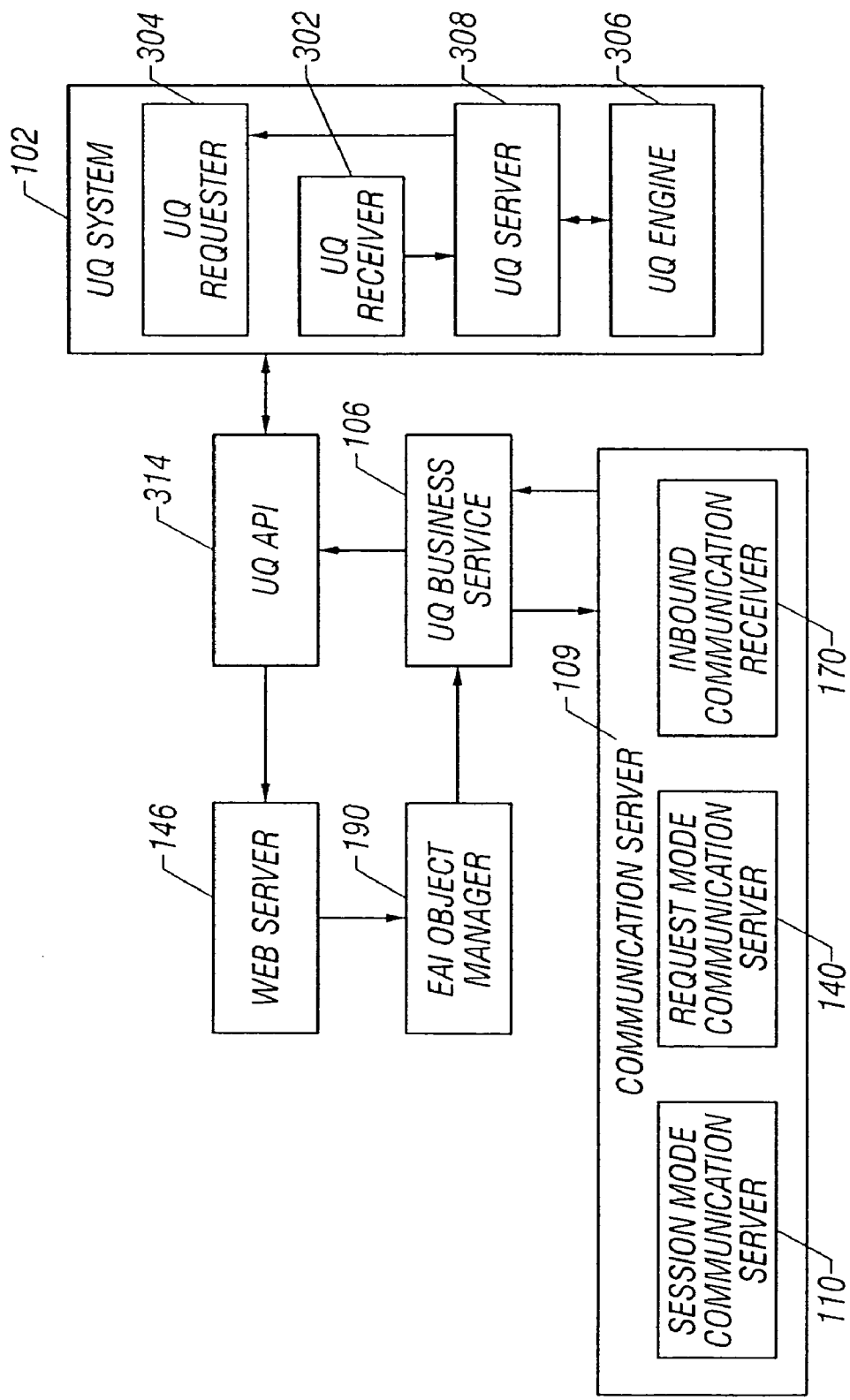
FIG. 3 shows one embodiment of a universal queuing system in accordance with the present invention.

Referring to FIG. 2, an example of a database schema 200 that can be used by client/server system 100 (FIG. 1) for storing and communicating channel driver information, agent limitations on media access, commands and events, inbound task management, agent preferences, agent status, media status, communication channel configurations, multiple queue support, and agent management is shown. Database schema 200 includes data structures for configuration base 202, command and event 204, system base 206, response group 208, and email profile access control 210.

Database schema 200 is further described in U.S. patent application Ser. No. 09/823,590, "System and Method for Multi-Channel Communication Queuing.".

Session mode communication server 110 also handles establishing and maintaining connections to one or more communication channels 130, such as communication channels 130A through 130D. Session mode communication server 110 uses one of channel drivers 120, such as channel driver 120A, to establish the connection. Having a connection to a communication channel enables the agent to receive an incoming work item, such as an email, intended specifically for that agent in real time. The connection can be to a middleware server, to a web server, directly to a media device, or to any other communication intermediary from which the customer can receive a communication. The connection can be established as a TCP/IP socket connection to a middleware server, as an OLE interface such as the IadviseSink interface, or as any other suitable inter-process communication scheme. Each of channel drivers 120 contains all information needed to establish the connection with communication channel 130 so that communication server 109 operates independently of communication channel 130.

Figure 1B:
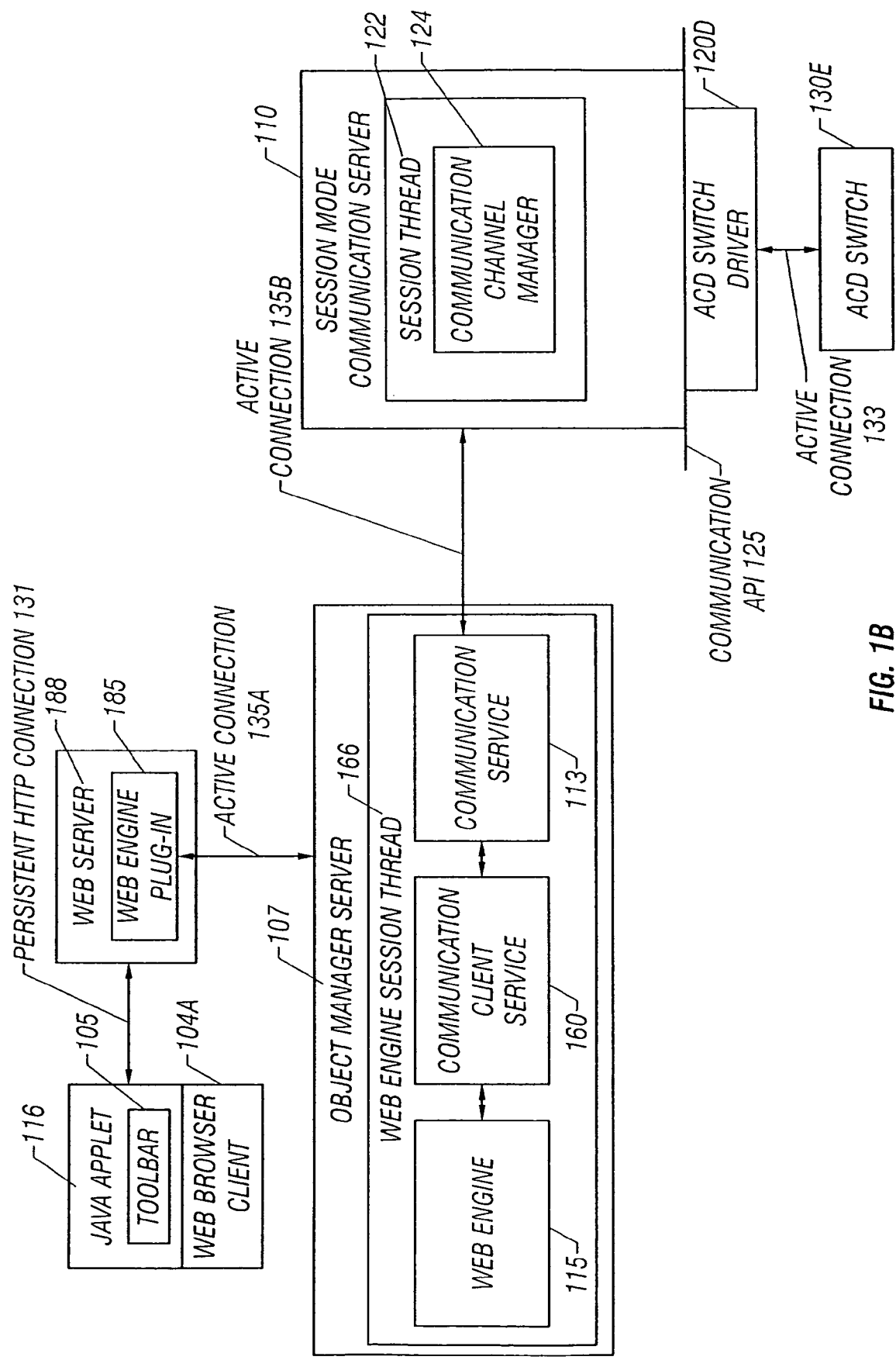

FIG. 1B shows a detailed view of one embodiment of session mode communication server 110. Session mode communication server 110 maintains knowledge of clients connected with each communications channel 130. When a request is received, communication server 109 dispatches the request to the appropriate server component in client/server system 100 for execution. Session mode communication server 110 is further described in U.S. patent application Ser. No. 09/823,590, "System and Method for Multi-Channel Communication Queuing.".

Figure 1C:
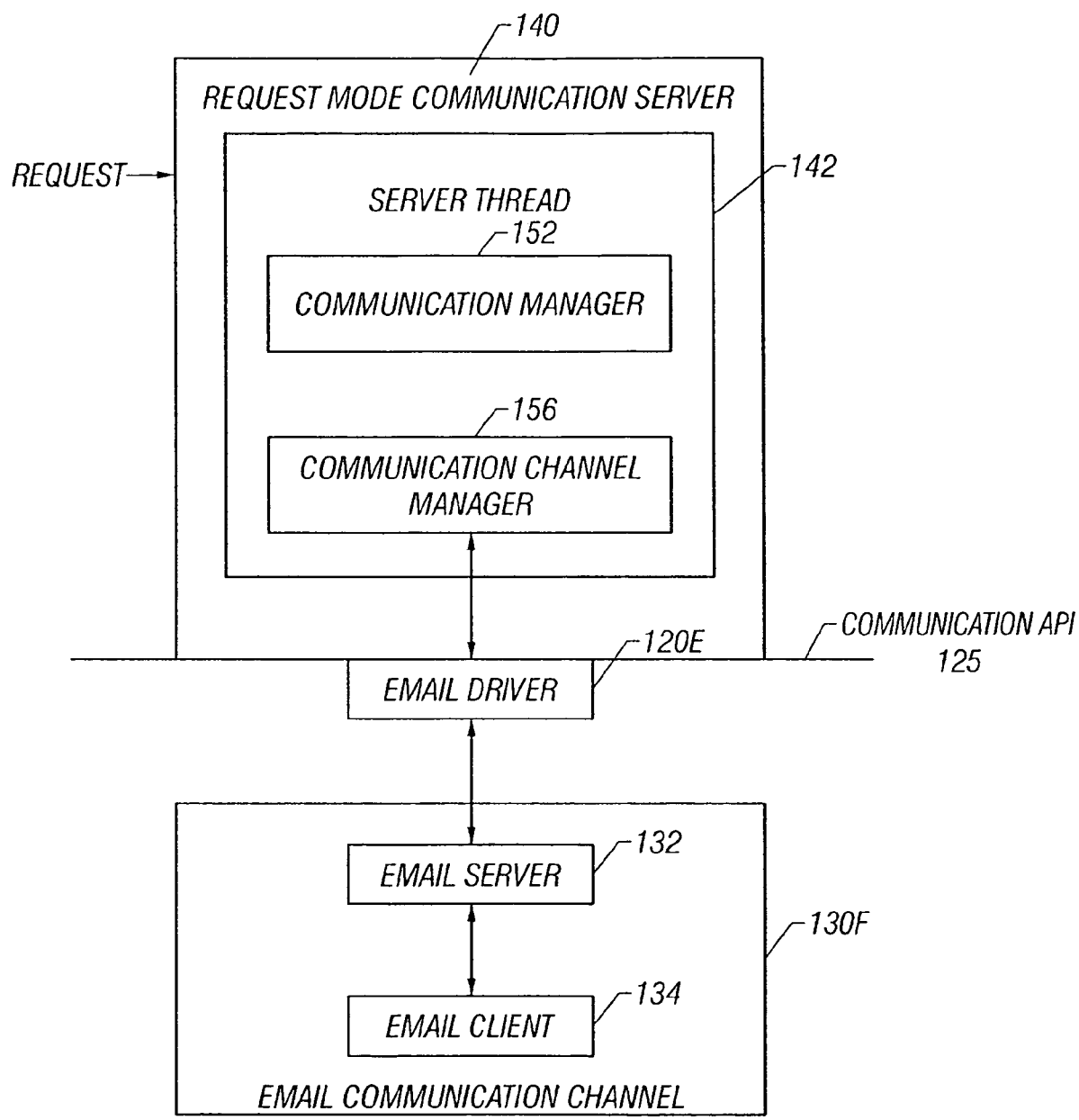

FIG. 1C shows components included in one embodiment of request mode communication server 140. Request mode communication server 140 handles the distribution of information via communication channels according to the request. An example of the operation of request mode communication server 140 is session mode communication server 110 sending a request to request mode communication server 140 to send a large number of emails on its behalf. This enables session mode communication server 110 to devote its resources to controlling the user interface, issuing commands, and handling events. Request mode communication server 140 is further described in U.S. patent application Ser. No. 09/823,590, "System and Method for Multi-Channel Communication Queuing."

Figure 1D:
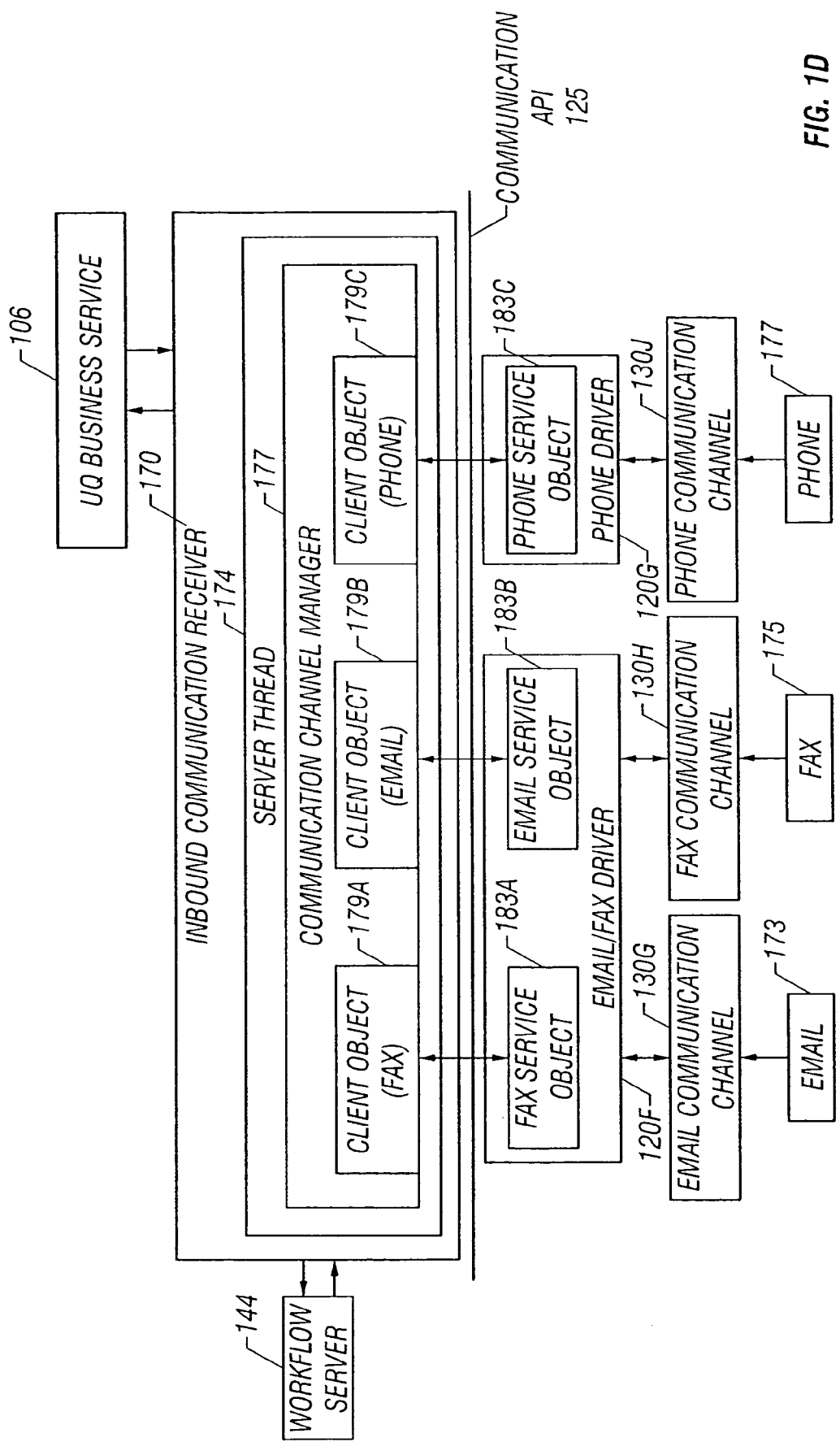

FIG. 1D shows an example of one implementation of inbound communication receiver 170. One embodiment of inbound communication receiver 170 is designed to serve inbound customer support requests with no connection to or knowledge of a client. This contrasts with session mode communication server 110, which communicates with a client to provide a user interface to at least one agent. In one implementation, inbound communication receiver 170 handles customer support requests that can be held in a queue for future processing, such as fax and email, whereas session mode communication server 110 handles high priority support requests that should be processed as quickly as possible, such as telephone calls, to improve customer response time. In another implementation, both inbound communication receiver 170 and session mode communication server 110 can handle high priority support requests. Inbound communication receiver 170 is further described in U.S. patent application Ser. No. 09/823,590, "System and Method for Multi-Channel Communication Queuing."

Universal Queuing System

UQ system 102 queues requests for all types of media until an agent is assigned to the request. As agents become available, either by an agent logging in, finishing a task, or due to a change in state or assignment, UQ system 102 pushes a work item from a communication channel to an agent, and removes the work item from the respective queue. In one implementation, when multiple work items are routed to an agent, the work item that arrived first is presented to the agent and the other work item is returned to its respective queue and rerouted/pushed to the next available agent that is capable of handling the particular work item.

UQ system 102 includes UQ receiver 302 and UQ requester 304 that interface with UQ engine 306 via UQ server 308. Web server 146 can be included in system 100 to receive messages from UQ system 102. In one embodiment, web server 146 receives the message and sends it to EAI object manager 190. EAI object manager 190 packages the messages and transmits it to UQ business service 106.

UQ Business Service

UQ system 102 interfaces with UQ business service 106 and web server 146 via UQ application programming interface (UQ API) 314. UQ business service 106 places information received from UQ system 102 into data structures used by communication server 109. UQ business service 106 also places information from communication server 109 into data structures, commands, and parameters recognized and used by UQ API 314.

In one embodiment, UQ business service 106 includes the following functions, with input and output parameters shown in parentheses, for initializing and communicating with the UQ system 102:

UQOpenConnection (UQConfigurationName, Return)
  This function is used for communication server 109 and UQ business service 106 to establish a connection to UQ system 102. UQ system 102, upon receiving the information contained in this request, will have the information required to allow UQ system 102 to establish a connection to communication server 109 via web server 146, EAI object manager 190, and UQ business service 106. The parameter "Return" in all of the UQ business service functions indicates status of the function upon return, for example, "0" means execution was successful.UQAssign (Return) Allows UQ clients such as communication server 109 to establish an agent for logging into UQ business service 106.
UQInitRules(Return)
  When UQOpenConnection is called, UQ business service 106 determines whether to upload rules, such as agent rules, and work item escalation rules. This function is called when an agent logs in to UQ business service 106. If the rules are to be sent, this function retrieves route rules and escalation rules from a data table and packages them for transmission to UQ system 102. Once rules are downloaded to UQ system 102, the UQReplaceRules function is called to modify the rules.
UQReplaceRules(Return)
  This function is called when the UQ rules need to be updated, such as when changes are made to a set of agent or escalation rules while communication server 109 is in operation.
UQ Disconnect (Return)
  Commands UQ system 102 to terminate the connection between UQ system 102 and web server 146, and between UQ system 102 and communication server 109. This function is called when UQ system 102 services are no longer needed.

In one embodiment, UQ business service 106 also includes the following functions for initializing and maintaining agents:

AgentLogon (AgentLogin, Return, AgentState)
This function allows an agent to log into UQ system 102. Once the login is successful, agent is ready to receive work items. The AgentLogin parameter is the agent identification number assigned in communication server 109. The AgentState parameter is set to a value indicating the agent's state after the function is executed.

AgentLogout (AgentLogin, Return, AgentState)
This function allows an agent to log out of UQ system 102. Once the logout is successful, UQ system 102 will not queue any more work items for this agent.

AgentInitAuxwork(AgentLogin, Output)
This function requests UQ system 102 to place the agent in AuxWork mode after all the current work items are completed. In AuxWork mode, agent will not receive more work but will remain logged in to the UQ system 102.

AgentAvailable(AgentLogin, Return, AgentState)
This function requests UQ system 102 to place the agent into available status. In the available state, the agent is ready to receive work items.

RequestAgentMediaMode (AgentLogin, MediaType, Return, AgentMediaMode)
This function allows clients 104 to request the agent channel mode for a certain channel. For example, an agent's fax channel mode can be "ready" while the voice channel could be "not ready."

ChangeAgentMediaMode (AgentLogic, Return, AgentMediaMode)
This function allows clients 104 to change the media mode for an agent.

ChangeAgentSkil (AgentLogin ,Return)
This function allows clients 104 to update the skill of an agent. After an agent's skill has been changed, this function should then be used to update UQ system 102 with the new agent skill.

RequestAgentState (AgentLogin, Return, AgentState)
To request UQ system 102 to report the current agent state.

RequestAgentWorkItemList (AgentLogin, Return, WorkItemID, MediaType,
IsScheduledTask, ScheduleStartTime, ScheduleEndTime, AgentID,
WorkItemState, WorkItemDataProperty)
Request the UQ system 102 to return a list of all work items currently being handled by an agent.

RequestAgentWorkableList (AgentLogin, Return, WorkItemID, MediaType,
IsScheduledTask, ScheduleStartTime, ScheduleEndTime, AgentID,
WorkItemState, WorkItemDataProperty)
This function requests UQ system 102 to return a list of possible work items for the agent. This function is used when the agent wants to pick a particular work item rather than being assigned to work items by UQ system 102.

RequestWorkItemAssignment (AgentLogin, WorkItemID, Return)
This function requests UQ system 102 to dispatch the specific work item to the agent if possible. If the work item is still available, the Return parameter code indicates SUCCESS and the work item will be delivered through communication server 109.

RequestAgentMediaState (AgentLogin, Return, MediaType, AgentState, NumWorkItems)
This function requests UQ system 102 to report the media (channel state) for each media that the agent is capable of handling.

In one embodiment, UQ business service 106 also includes the following functions for initializing and maintaining work items:

AddWorkItem (WorkItemID, MediaType, IsScheduledTask, ScheduleStartTime,
ScheduleEndTime, WorkItemDataProperty, Return)
This function requests UQ system 102 to add the specific work item into the UQ system 102 for future dispatch.

Request WorkItemState (WorkItemID, Return, WorkItemState)
This function requests the current state of a work item.

AcceptWorkItem (WorkItemID, Return)
This function allows clients 104 to tell UQ system 102 that the assigned work item has been accepted. As a result, agent state and work item state are updated by UQ system 102 to reflect the acceptance of the work item.

RejectWorkItem (WorkItemID, AgentLogin, Reason, Return)
This function allows clients 104 to tell UQ system 102 that the assigned work item has been rejected. As a result, the work item will be sent back to the queue and the agent state for the channel will be set to AuxWork.

CompleteWorkItem (AgentLogin, WorkItemID, Return)
This function informs UQ system 102 that the work item is completed. The next state for the agent will depend on the Auto-Wrap setting, which can be set via a user interface such as toolbar 105. If Auto-Wrap is True, the agent is in Wrap mode and the work item will be in wrap mode. If Auto-Wrap is FALSE, the agent is placed back in the Available state.

HoldWorkItem (AgentLogin, WorkItemID, Return, WorkItemState,
NewAgentState).
This function requests UQ system 102 to put a work item on hold status.

UnHoldWorkItem (AgentLogin, WorkItemID, Return, WorkItemState,
NewAgentState).
This function requests UQ system 102 to take a work item off hold status.

BlindTransferWorkItemToAgent (AgentLogin, WorkItemID, Return)
This function transfers a work item to another agent. If the agent is not available, the work item can be queued for the agent.

TransferWorkItemToAgent (AgentLogin, WorkItemID, Return)
This function tells UQ system 102 to transfer the work item to the agent. If the agent is not available, UQ system 102 can inform the requesting agent that the work item is not deliverable.

TransferWorkItemToRoute (AgentLogin, RouteID, Return)
This function transfers an agent to a route defined in the system 100 (FIG. 1). A route represents a specific way to process the work item. Transferring a work item to a route redefines the characteristics of the work item and the way the work item should be handled. For example, the work item was first believed to be best handled by agents with knowledge in one area and now find that it should be handled by an agent having knowledge in another area. Therefore, this work item is transferred to a route that can handle the work item.

In one embodiment, UQ business service 106 includes the following functions for reporting performance statistics:

SetChannelStatInterval (Interval, Return)
This function is used to set the feeding interval of the channel real time statistics. A predetermined default, such as 60 seconds, can be used. Statistics are transmitted to UQ business service 106 and logged into a table.

StartAgentStat (Interval, Return)
This function is used to initiate the transmission of agent statistics. Data is logged to an agent statistics table.

StopAgentStat (AgentLogin, Return)
This function is used to stop the transmission of agent statistics.

In one embodiment, UQ business service 106 includes the following functions for handling work items:

HandleWorkItem (AgentLogin, WorkItemID, MediaType, IsScheduleTask,
ScheduleStartTime, ScheduleEndTime, AgentLogin, WorkItemState,
DataProperty, MediaType, IsScheduleTask, ScheduleStartTime,
ScheduleEndTime, AgentLogin, WorkItemState, DataProperty, Return)
This function is used to inform a client that a work item is being assigned to an agent.

HandleWorkItemStatus (WorkItemID, MediaType, IsScheduleTask,
ScheduleStartTime, ScheduleEndTime, AgentLogin, WorkItemState,
DataProperty, Return)
This function is used to inform clients 104 that the status for the work item has been changed, so clients 104 can take any action that is necessary as a result. For example, work item status could be changed from alerting to complete because the other party abandoned the work item. In this case, clients 104 may have some housekeeping to perform.

HandleAgentStateChange (AgentLogin, AgentState, Return)
This function is used to inform UQ client that the state of the agent has been changed.

HandleRouteStatisticsRequest (RouteStat, TotalWorkItems, AverageWaitTime,
AverageServeTime, NlongestWaitTiem, OperationMode, Return)
This function is used to inform clients 104 of the arrival of route statistics information. This method will handle the incoming statistics information, for example, by writing it to a database.

HandleAgentStatisticsRequest (AgentLogin, TotalWorkItems,
AverageServeTime, AverageWrapTime, TotalAuxTime, TotalServingTime,
TotalLoginTime, TotalServedWorkItem, Return)
This function is used to inform the UQ client of the arrival of agent statistics information. This method will handle the incoming statistics information. Very likely the information will be written to a database.

HandleError (MessageCode, Return)
This function is used to inform UQ client that an error is received.

HandleAlarm (MessageCode, Return)
This function is used to inform UQ client that an alarm is received.

HandleJournal (WorkItemID, WorkItemDataProperty, AgentStateHist,
AgentLogin, AgentState, StartTime, EndTime, UQReasonCode,
AgentReasonCode, EscHist, SzStep, StartTime, EndTime, UQReasonCode,
AgentReasonCode, Return)
Journal of a work item to be sent to UQ client when the work item is completed. UQ client will log the journal into database.

The foregoing lists are examples of functions that can be included in UQ business service 106. Other functions can be included in addition to, or instead of, these examples. Some of the functions include return codes and/or state codes to indicate whether a requested function was performed successfully and/or the state of UQ system 102, a work item, or an agent. The following lists provide examples of codes that are used as parameters in the preceding functions:

| | Return Code |
|---|---|
| 0 | Success |
| 1 | Success_More_Status |
| 2 | Error_Uq_Initialized |
| 3 | Error_Uq_Not_Initialized |
| 4 | Error_Failed |
| 5 | Error_System_Wrong_Api |
| 6 | Error_System_Initialization_Failed |
| 7 | Error_Agent_Setting_Invalid_State |
| 8 | Error_Agent_Undefined |
| 9 | Error_Agent_Unable_To_Change_Skill |
| 10 | Error_Queue_Not_Initialized |
| 11 | Error_Queue_Undefined |
| 12 | Error_Queue_Capacity_Exceeded |
| 13 | Error_Workitem_Adding_Failed |
| 14 | Error_Workitem_Failed_Change_State |
| 15 | Error_Unknown_Media |
| | Agent State |
| 1 | Available |
| 2 | Logout |
| 3 | Busy |
| 4 | AuxWork |
| 5 | InitAuxWork |
| | Media Mode |
| 1 | Available |
| 2 | Unavailable |
| 3 | Busy |
| 4 | Wrap_Up |
| | Operation Reason Code |
| 1 | Setting_Invalid_State |
| 2 | Agent_Not_Available |
| 3 | Route_Undefined |
| | Work Item State |
| 1 | Active |
| 2 | Wrap_Up |
| 3 | Alerting |
| 4 | Completed |
| 5 | Queued |
| 6 | Scheduled |
| 7 | On_Hold |
| 8 | Received |

UQ Configuration

Referring to FIGS. 1A-D and 3, clients 104 choose a UQ configuration via the UQOpenConnection function in UQ business service 106. UQ system 102 uses information such as "UQ receiver server name" and "UQ receiver Port" to determine where to send responses. In one embodiment, multiple receiver servers (not shown) in EAI object manager 190 can be connected to receive messages from UQ system 102, Each sender on the communication server 109 sends different OpenConnection information to UQ business service 106. UQ business service 106 establishes the connections back to communication server 109 via web server 146 and EAI object manager 190 based upon the information provided. The receiver server, i.e., web server 146 and EAI object manager 190 can be the same for all UQOpenConnection requests or different receiver servers, i.e., different instantiations of web server 146 and EAI object manager 190 can be used. Table 1 shows an example of parameters in a UQ configuration table that is stored in UQ system 102 and used to establish communication with and perform functions as requested by communication server 109 via the UQOpenConnection function. For example, Table 1 includes parameters for identifying and establishing communication with the host for UQ system 102. Table 1 also includes default settings for agent preferences such as whether an agent is in the auto-ready state after login or in the auto-auxwork state after login.

TABLE 1

UQ Configuration Table

| Configuration Name | |
|---|---|
| UQ Host Name | Identifier for host for UQ system 102 |
| UQ Host Port | Address of host |
| HTTPURLTemplate | Name of primary receiver server |
| HTTPLoginURLTemplate | |
| HTTPLogoutURLTemplate | |
| Business Service | Specify the name of UQ business service 106 that will be invoked when outbound XML is sent. |
| Method | The name of method to be invoked in the UQ business service 106 mentioned above. |
| MaxConnection | Maximum number of connections to be opened on the primary receiver server. UQ system 102 has the option to send events to any of those open connections. By opening up multiple connections, multiple requests can then be processed. |
| Transport | This parameter specifies the transport scheme from communication server 109 to UQ system 102. In one embodiment, the transport scheme includes an HTTP option, which uses a HTTP Transport Business service (not shown) to send request to UQ system 102 or a 'WorkFlow' option which uses the workflow process 144 to send a request to UQ system 102. |
| SecondaryHTTPURLTemplate | For secondary UQ receiver server (optional). If included, this receiver server is used for primarily for non-time critical message such as alarm, error, statistics and journal. If no secondary receiver server is included, the primary receiver server in EAI object manager 190 can be used. |
| SecondaryHTTPLogout URLTemplate | Template for logout information |
| SecondaryHTTPLogin URLTemplate | Template for login information |
| SkillBC:<Business Component Name> | A Skill map that contains a list of skills and associated skill items for a client. Includes a list of business skills. For example. SkillBO:Industry = Industry SkillBO:Internal Product = Internal Product SkillBO:Language Def=Language Def SkillBO:Product Line=Product Line Briefing |

TABLE 1-continued

UQ Configuration Table

| Configuration Name | |
|---|---|
| AuxWorkAfterLogin | If "true", place the agent to Aux mode after login. Default is "true" |
| LogoutFromAvailable | If "true", allow agent to logout at Available state. Default is "true" |
| WrapEnabled | If "true", wrap state is valid for agent. Default is "true" |
| Load Balancing | If "true", Server Load Balancing is used and installed. Default is "false" |

Table 2 shows a subset of parameters in the UQ Configuration table in Table 1 referred to as PropertyInfo parameters that are used in other functions that are included in UQ business service 106.

TABLE 2

Property Information Parameters

| Name | Purpose |
|---|---|
| UQ Host Name | |
| UQ Host Port | |
| HTTPURLTemplate | Template to be used in HTTP URL for login and making requests |
| HTTPLoginURLTemplate | Template to be use in HTTP for login |
| HTTPLogoutURLTemplate | String that needs to be included in the logout process |
| MaxConnections | Number of connections that need to be opened |
| Secondary Receiver Host | |
| Secondary Receiver Port | |
| SecondaryHTTPURLTemplate | |
| SecondaryHTTPLogoutURLTemplate | String that needs to be included in the logout process |

Web server 146 handles packing information using a suitable data transfer protocol for outgoing messages to EAI object manager 190. In one implementation, for example, HTTP is used to communicate messages to and from UQ API 314. Web server 146 converts information in HTTP format to another suitable transport protocol which EAI object manager 190 unpacks for use by UQ business service 106. In other embodiments, other protocols known in the art can be used instead of, or in addition to, HTTP.

UQ Routing

UQ engine 306 defines a route for processing each work item. For example, if a work item is a fax requiring response from an agent with knowledge of computer networking, the UQ engine 306 would define a route that specifies an agent with computer networking skills. An agent can transfer the work item to a route queue using the functions TransferWorkItemToRoute(Route configuration Name) or BlindTransferWorkItemToAgent(agentID) if the agent is not able to respond to the work item. The skill requirements for the work item can be changed before invoking the transfer if the agent determines that a different skill is necessary to respond to the work item.

In one embodiment, route points are generated, wherein each route point has specific skill requirements. When a work item is to be transferred to another point, the transferring agent can choose a route point from a pop up list, for example. The list can include the option to either list all agents or all route points.

UQ System Scenarios

The following examples show how requests from clients are processed through one embodiment of system 100:

Initialization and Rules Download

Communication server background mode server 170 uses UQOpenConnection function in UQ business service 106 to connect clients with UQ system 102. In one embodiment, two or more configurations can be available to initialize UQ business service 106, including a default configuration. The default UQ configuration parameters are used if no other configuration is specified. The UQPropertyInfo parameters of UQOpenConnection included PrimaryReceiverName and PrimaryReceiverPort which identify the location of the primary receiver server in web server 146. In an alternative embodiment, HTTPLoginTemplate and HTTPLoginBodyTemplate are used to identify the receiver, which is typically web server 146.

UQOpenConnection can be invoked multiple times to connect multiple receiver servers in web server 146 to UQ system 102, and UQ system 102 maintains a list of all connections to the connected receiver servers. After a successful UQOpenConnection, the function UQInitRules can be invoked to download agent skill information, as well as rules for escalating agents and specifying routes. In one embodiment, UQInitRules is invoked only once during initialization, and the function UQReplaceRules is used to update the rules once they have been initialized. The parameter ERROR_UQ_INITIALIZED indicates an error if UQInitRules if subsequently invoked. An indicator of whether the initialization was successful is supplied in the Return parameter associated with the UQInitRules function.

Agent Logon

New agents invoke UQOpenConnection through business service 106 to inform UQ system 102 that there is a new agent. The function AgentLogon is then invoked by UQ business service 106 to log the agent into UQ system 102. UQ business service 106 then sends a message that includes the agent skill information to UQ system 102. There is a parameter in UQOpenConnection to identify the name of the connection. When AgentLogon is used, there is also a parameter to identify which connection this agent will use. This connection ID is for messages coming from UQ system 102 to communication server 109.

If multiple receiver servers are connected, each invocation of the function AgentLogon includes information about the agent's connection. Agent information also includes information including auto-available setting and auto-wrap setting. UQ system 102 returns either the error if the invocation to AgentLogon fails, or returns the new agent state if the logon operation was successful.

Email Arrival

When communication server 109 receives an email message, it sends the message along with related information regarding the client who sent the message to UQ business service 106. UQ business service 106 transfers the email message and related information to UQ system 102 via the AddWorkItem function. UQ system 102 determines whether to accept the work item and issues a response to communication server 109 via web server 146, EAI object manager 190, and UQ business service 106 indicating whether the work item was accepted using the status parameter in the HandleWorkItem function.

UQ Delivers Work Item

UQ system 102 determines an agent for a work item and sends a message that the work item was assigned to an agent to communication server 109 via the receiver server associated with the agent. UQ system 102 then transmits a message via the HandleWorkItem function to the web server 146 and EAI object manager 190 associated with the agent. The ProcessEvents function in UQ business service 106 is then invoked to dispatch the message to an agent. The agent invokes the WorkItemAccept function to inform UQ system 102 that it received the work item.

UQ System Issues an Alarm or Error

As an example of one method for UQ system 102 to notify communication server 109 of an error or alarm, assume UQ system 102 determines that the number of requests that can be handled by one of the communication channels has exceeded a predefined threshold. UQ system 102 sends a return code to the receiver server via the HandleError function indicating that the queue capacity has been exceeded. EAI object manager 190 receives the message and invokes the function "ProcessEvents" in UQ business service 106. The error message can be logged and broadcast to the component that issued the request. Alarm messages are handled in a similar manner. The error/alarm can be broadcast visually, aurally, textually, and/or by any other suitable means known in the art.

As an example of one method for UQ system 102 to notify communication server 109 of an error or alarm, assume UQ system 102 determines that the number of requests that can be handled by one of the routes has exceeded a predefined threshold. UQ system 102 sends an error code to the receiver server via the HandleError function indicating that the queue capacity has been exceeded. EAI object manager 190 receives the message and invokes the function "ProcessEvents" in UQ business service 106. The error message is logged into database. An error or alarm indication is also sent to the agent and administrator console.

UQ System Sends Statistics to Communication Server

A client or other component in system 100 (FIG. 1) can request statistics regarding its communication channels, agents, and/or the routing of agents, from UQ system 102 via SetRouteStatInterval, SetChannelStatInterval, StartAgentStat, and StopAgentStat functions. UQ system 102 generates the requested statistics and transmits them to Web server 146. When the receiver server in EAI object manager 190 receives the message, it can log the statistics and broadcast them through an interface such as a message bar mechanism, as known in the art. Agent configurations can be set up to request statistics on a continual basis. The statistics can include information for work items completed as well as work items in the agent's queue.

Agent Accepts a Work Item

When an agent is in AuxWork mode, the agent can choose a work item from the queue through a user interface such as the toolbar 105. RequestWorkableItemList is used to retrieve a list of the work items. When a work item is selected, UQ system 102 is notified via the RequestWorkItemAssignment function in business service 106. If the work item is available, the function will indicate a successful selection through the return parameter and the work item is delivered via the HandleWorkItem function. The RequestWorkableItemList function can return an error indicator if the work item is not available for the agent.

Call Routing

When UQ system 102 receives a route request, UQ system 102 determines the agent to assign to the work item and sends a message to the agent's receiver server in EAI object manager 190 that includes the assigned agent and the work item. If UQ system 102 cannot find an agent to assign within the time allowed, the request is placed in a waiting queue as implemented by UQ engine 306. It is important to note that many different types of commercially available queing engines 306 can be used in UQ system 102.

Automated Call Distribution (ACD) Interaction with the UQ System

Referring to FIGS. 1A-D and 3, an agent can be connected to receive calls directly from ACD switch 130E, without interacting with UQ system 102. Agents can also be connected to receive calls from ACD switch 130E as well as other work items through UQ system 102. When agent is in Auxmode, he will not receive any work items.

There are several alternative implementations that can be used to place an agent in the AuxWork state. For example, an agent can default to AuxWork state. UQ system 102 can be notified when ACD switch 130E receives a call that should be handled by the agent, and the agent notified to suspend processing a work item, such as a response to an email request, to take the call. The agent notifies UQ system 102 when the call is completed, and returns to processing the suspended work item.

Agent State Change

When a work item is dispatched to an agent, the agent invokes the AcceptWorkItem function to accept the work item. Output parameters in AcceptWorkItem inform UQ system 102 of the new agent state and work item state. When the agent completes the work item, it invokes the CompleteWorkItem function to inform UQ system 102 of the new agent state and work item state.

An auto-wrap option can be set in the agent's configuration table that allows an agent time to wrap up a work item upon completion. Agents can select an interface option that invokes the AgentAvailable function to indicate that they are out of wrap up mode and ready to accept another work item. UQ system 102 changes the status of the work item to Complete and places the agent in the Auxwork state if AgentInitAuxWork function has been invoked. If the AgentInitAuxWork function is not invoked, the agent's state is set to BUSY if there are other work items in the queue that the agent can handle. Otherwise the agent is placed in the Available state.

Work Item Cancelled

A situation can arise when a work item is cancelled after it has been assigned to an agent, but before the agent has accepted the work item. Such a situation may arise, for example, when a caller hangs up while waiting. In this case, the UQ system 102 informs the client that the work item is cancelled through HandleWorkItemStatus and a signal, such as a blinking button on the agent's user interface display, can be changed to indicate that the work item was removed.

PBX And Email With PBX Higher Priority

The term private branch exchange (PBX) refers to a subscriber-owned telecommunications exchange that usually includes access to the public switched network. When an email and a PBX work item are queued, UQ system 102 uses the priority set forth in the route rules to determine which media will have higher priority over the other. Client configurations typically give PBX work items higher priority than email.

Work Item Journal

When a work item is completed, UQ system 102 sends a work item journal entry to communication server 109 via the HandleJournal function. The journal entry includes information to identify whether the journal entry pertains to the agent state history and/or the work item escalation history of the work item.

System Failure

If the connection between UQ system 102 and session mode communication server 110 fails, UQ system 102 will remove all agents associated with session mode communication server 110 and send all non-interactive workitems back to UQ system 102 for future dispatch. All interactive work items are marked as complete. Note that an administrator can designate a particular communication channel as interactive or non interactive, and the work items that are routed through the communication channel are designated as interactive or non-interactive correspondingly.

Multiple Requesters and Receivers

When UQ business service 106 is instantiated, it will load the UQ configuration including the sender's server component name and the workflow name. In one embodiment, an HTTP transport business service routes the request to the appropriate component in communication server 109. If there are multiple EAI object managers 190 for receiving messages from UQ system 102, a load balancer is included to route request to the appropriate EAI object manager 190.

Each work item sent by UQ clients include a login and a client key associated with the work item. When the same work item is being returned form UQ system 102 as a result of either an agent assignment or problem with the work item, the login and the client key are used to route the result to the right client.

Blind Transfer of a Work Item to an Agent

An agent can use the function InitTransfer to transfer a work item to another agent if the agent cannot respond to the work item, or thinks that another agent is better qualified to respond. If the transferree agent is not available to accept the work item being transferred, the work item will be queued until the agent is available.

Consultative Transfer of a Work Item to an Agent

An agent can invoke the TransferWorkItemToAgent function to transfer a work item to another agent to consult with the other agent regarding the work item. If the agent is not available for consultation, UQ system 102 informs the agent that the other agent is not available. The agent can select whether to hold on to the work item, retry, or send the work item to a route.

Transfer Work Item to a Route

An agent can use the function TransferWorkItemToRoute to transfer a work item to along a route to another agent. This is useful, for example, when an agent receives a work item that would be handled more efficiently by an agent with other skills.

UQ API

In one embodiment, a client server system 100 (FIGS. 1A-E) in accordance with the present invention includes UQ API 314 for communicating with UQ system 102. For example, the interface can translate information in one format, such as a data table used by UQ business service 106 to an extensible markup language (XML) format used in UQ system 102. UQ API 314 can also translate information between other formats suitable for use in UQ business service 106 and UQ system 102. Alternatively, the same format can be used throughout system 100, thereby eliminating the need for UQ API 314. UQ API is further described in copending U.S. patent application Ser. No. 09/823,678, entitled "Extensible Interface For Intermodule Communication".

In one embodiment, a user interface for entering and editing agent skills is provided. An example of an agent skill graphical user interface (GUI) is described in U.S. patent application Ser. No. 09/823,531, entitled "Communication Toolbar Supporting Multiple Communication Channels of Different Media Types". The agent skill GUI includes fields for selecting, entering and editing agent information including name, employee number, job title, login name, contact information, skills, and the level of expertise for each skill item. After a client updates the skills of an agent through the agent skill GUI, the ChangeAgentSkill function in UQ business service 106 can be used to update agent information in UQ system 102.

UQ API Data Structures

FIGS. 4*a*-4*m* show examples of tables representing data structures that are used in one embodiment of UQ API 314 for communicating information between UQ system 102 and communication server 109.

FIG. 4*a* shows Table UQ_CFG which defines UQ system 102 configuration parameters such as the UQ server name, server port, receiver name, and receiver port.

FIG. 4*b* defines Table UQ_CFG_PARAM which includes configuration parameters for UQ system 102 such as the configuration identifier, and the name of the configuration.

FIG. 4*c* shows an example of a table that can be used for information pertaining to a route including the name of the route; the priority of the route; the media type; the media service level to indicate how quickly work items should be handled; whether the route is active; the service level to indicate the number of seconds by which the majority of the work items need to be handled in the route; the capacity of the route; the route selection criteria; the IsContact; when to activate the first escalation rule; and whether a workitem can be routed to an agent who is not available.

The route selection criteria allows UQ system 102 to examine the work item to determine whether the route can handle the work item. For example, consider an email route with the following selection critiera: SiebelMediaType=Email & Category=money & ReceiverAddress=sales@siebel.com. If the email route includes all of the above properties, this email will be assigned to the route. The IsContact field identifies whether a real time agent is needed or not. If IsContact is false, the work items assigned to this route will be sent to an agent who is logged in regardless of his availability. If IsContact is true, the work items can be sent to agent whether they are logged in or not. The routes can be transmitted from communication server 109 to UQ system 102 via the UQInitRules and UQReplaceRules functions, as described hereinabove.

FIG. 4*d* shows an example of a table that can be used to store values that further define the properties of a route. For example, an email can have "recipient", "subject" and category properties. A fax mail be Dialed Number Identification Service (DNIS) and Automatic Number Identification (ANI) properties. These properties can be translated into skill. For example, "Recipient"="Sales" can be translated into "Department"="Sales". Another example is "DNIS"="8000" can be translated into "Product"="NT".

FIG. 4*e* shows an example of a table for escalation rules that define how the processing of a work item can be escalated if the work item has not been served for a pre-defined period of time. Each escalation rule defines a way that a work item should be processed. The escalation rules can generalize the skill requirement of a work item so that the chance of having the work item served is improved. Each escalation rule can also be associated with a sequence number that indicates the order in which the particular escalation will be executed in relation to the other escalation rules for the specified route.

FIG. 4*f* shows an example of a table for escalation rules that includes the name of the escalation rule, the name of a skill associated with the rule, the names of skill items for the skill, and the level of expertise required for the skill items. An example of a skill name is "language". Examples of skill items for the skill name are "English", "Spanish", and "French". Any suitable range of values can be used to indicate level of expertise, for example:

3=EXPERT
2=INTERMEDIATE
1=NOVICE
0=NO_SKILL

A skill item can be a macro to indicate it is a substitution of a property from the work item data properties. This applies to language skills, as well as other skills.

FIG. 4*g* shows an example of a table for storing a skill associated with a route property. The skill map includes a collection of skills required for the particular route property, and each skill is a collection of skill items. This can include a list of possible properties for each media type. For example, email media type can have subject, courtesy copy (CC), and recipient properties. Private Branch Exchange (PBX) media type can include ANI and Language properties. The skill map can also be used to associate a particular value for a media type property with a particular product. For example. "DNIS"="8000" could be translated into "Product"="NT".

FIG. 4*h* shows an example of a table for storing the number of end points, also referred to as maximum number of sessions, for each media type that a particular agent can handle.

FIGS. 4*i*-4*k* show examples of tables for storing route, media, and agent statistics information, respectively. In one embodiment, the statistics are sent from UQ system 102 to communication server 109 at pre-defined time intervals as specified in the UQ configuration passed to UQ system 102. An agent or administrator can also request statistics when desired through communication server 109. Some of the statistics, such as "Average Wait Time" are time dependent, and therefore, the time period is also included as part of the data.

FIG. 4*l* shows an example of a table for storing the error log.

FIGS. 4*m*-4*p* show examples of tables for storing the processing history of each work item.

Other tables can be included in an embodiment of UQ system 102 in addition to, or instead of, the tables shown in FIGS. 4*a*-4*p*.

Figure 4Q:
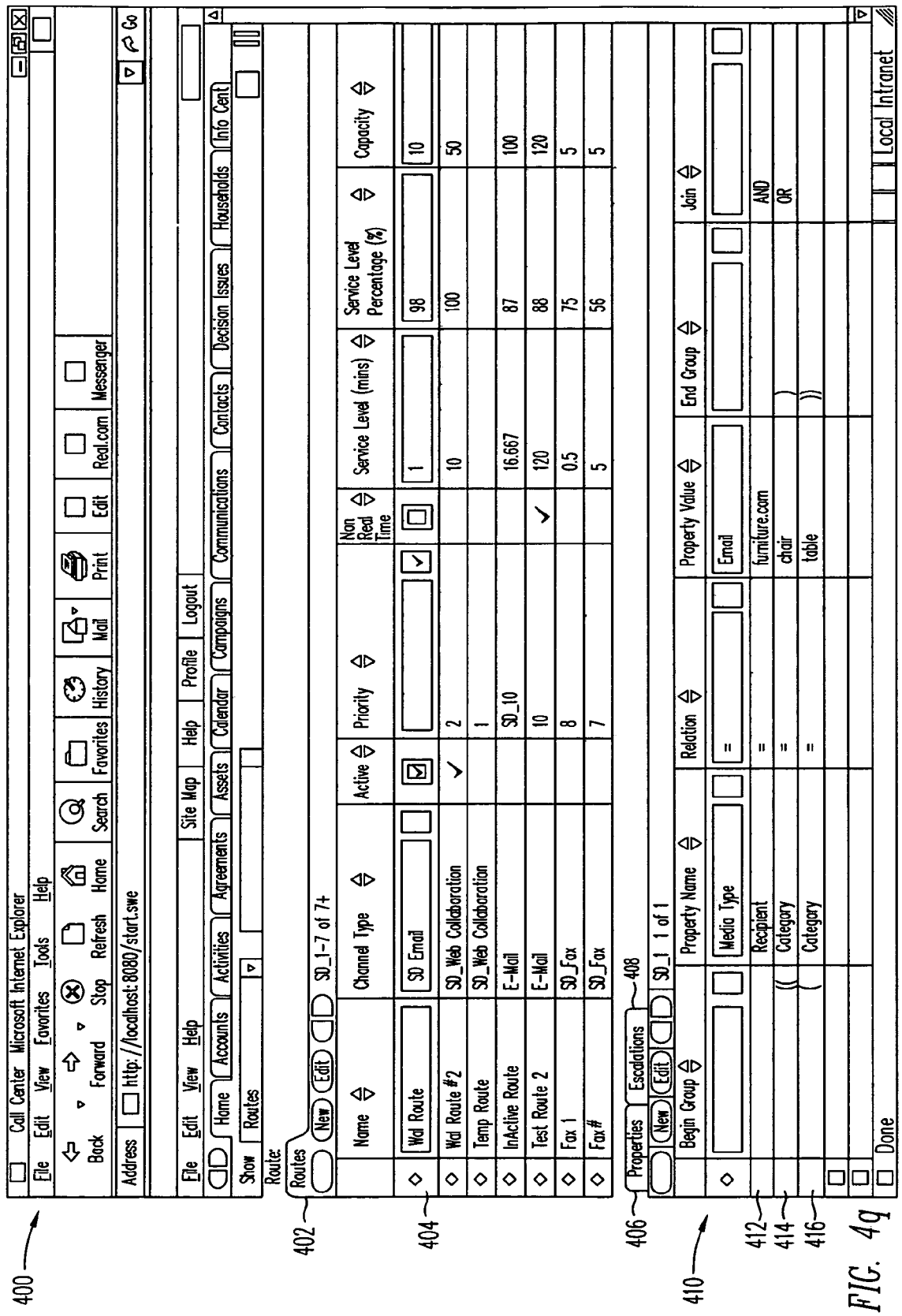
FIG. 4q is an example of an administrator's interface for entering routing rules and route properties information.
Figure 4T:
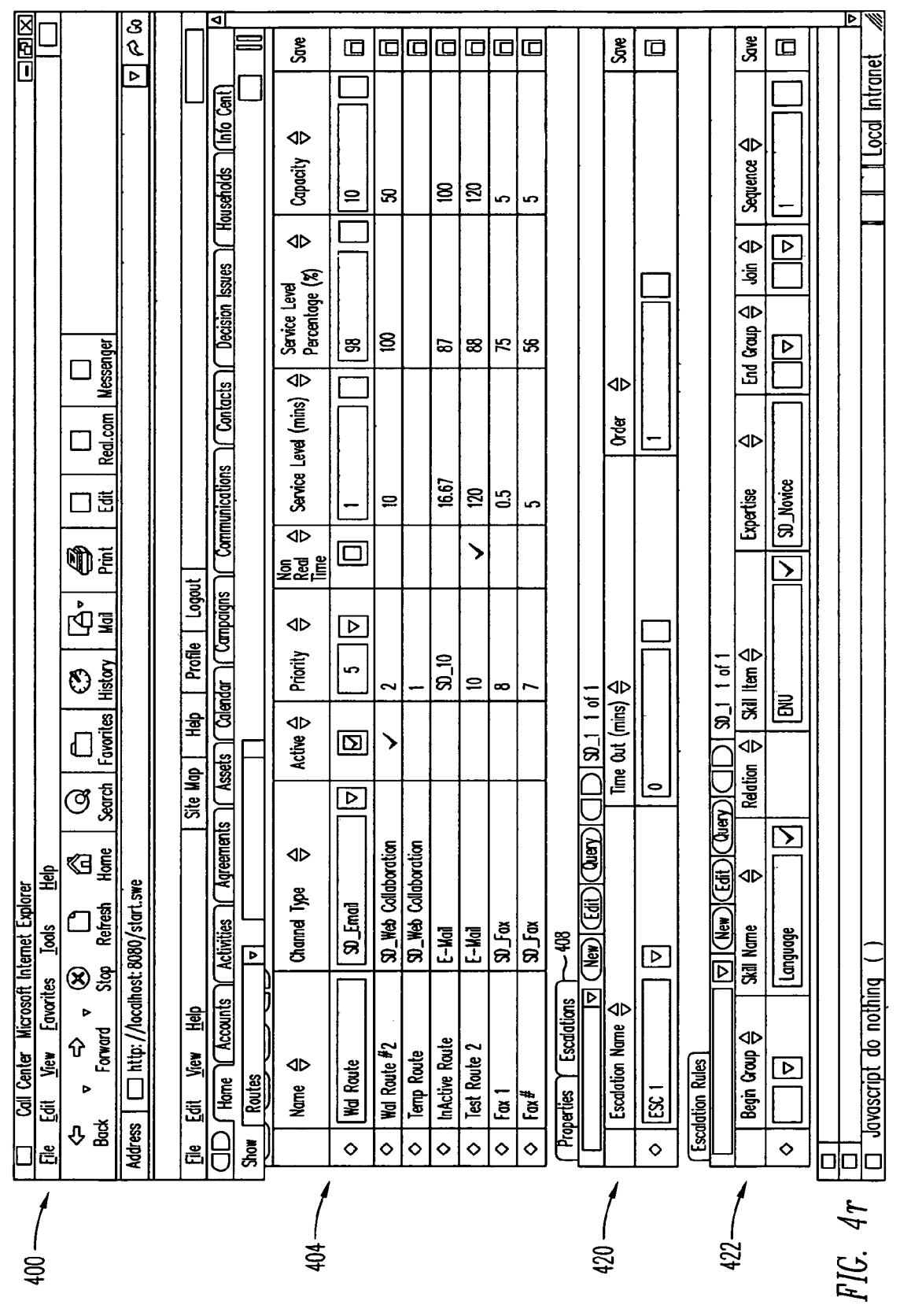
Figure 4S:
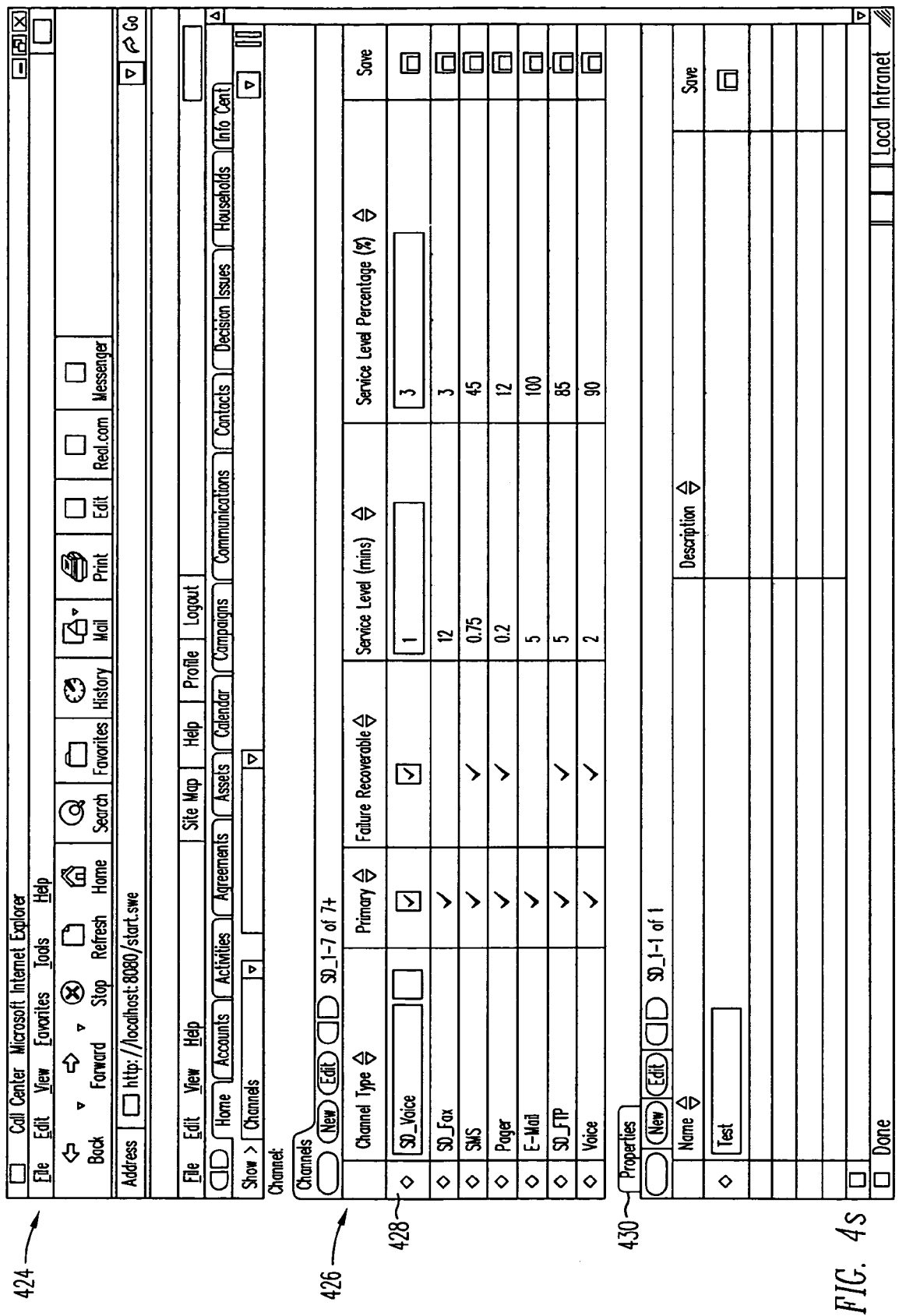
FIG. 4s is an example of an administrator's interface for entering channel information and properties for the channels.

The route definitions, properties, escalation rules, channels, and channel properties can be entered via a user interface, as shown in the example administrator interfaces in FIGS. 4*q*, 4*r*, and 4*s*. Note that other suitable types of interfaces for entering this information can be used, with the interfaces shown in FIGS. 4*q*, 4*r*, and 4*s* being just one example.

FIG. 4*q* is an example of an administrator's interface 400 for entering routing rules and route properties. Route window 402 allows an administrator to interactively add, delete, and edit route information. Information for each route can be displayed and modified including the name of the route, the channel type (also referred to as the media type), whether the route is active, the priority for work items assigned along the route, whether it is a real-time route, and the capacity of queued work items allowed for the route. The priority can be used to prioritize work items for the assigned agent.

The route window 402 also includes information regarding the route service level and service level percentage. These values indicate the amount of time within which the given percentage of the work items need to be handled in the route. Selecting a route in route window 402 causes the route to be displayed in the uppermost line 404 of the list, which includes data entry windows for entering and modifying the selected route's parameters.

Administrator's interface 400 also includes properties tab 406 and escalations tab 408 that can be selected to view, add, edit, and delete properties and escalation rules for the selected route shown in line 404. The properties and escalation rules provide a set of parameters that are used by UQ engine 306 to determine how to handle work items according to the administrator's preferences.

When properties tab 406 is selected, the administrator can enter property information for the route. The properties define the characteristics of the work to be performed using the route, and as many properties as desired can be defined for the route.

In the implementation shown in FIG. 4q, selecting the properties tab 406 invokes properties interface 410 that allows an administrator to add, delete, and edit one or more properties for the selected route. Multiple properties can be combined using a language code with relational operators that are evaluated when applying the properties to the corresponding route. For example, the begin group can be selected from a list of delimiters such as single or multiple parentheses, followed by a property, a relational operator, a property value, an end group, and a joinder operator that allows expressions to be grouped together. The properties, relational operators, property values, end group, and joinder operators can also be selected from a pull-down list that includes the available selections defined by the administrator. The joinder operators can be implemented using any suitable relational operators, such as Boolean operators. The following expression of properties results from the entries shown in lines 412, 414, and 416 for an email:

Recipient=furniture.com AND ((category=chair)OR (category=table))

The Recipient property is derived from the addressee of the email, and the category can be derived from the contents of the email. This means that UQ engine 306 can include a function that scans the work item and determines the subject of the content by analyzing the number of times keywords and phrases appear. Additionally, a commonly used linguistic representation of textual content known in the art is the "bag of words" representation can also be used. In this approach, the content is represented as a list of the words that appear in it and as a vector of features, with a specific frequency assigned to each feature. In some cases the words are stemmed so that similar words map to a common root. For instance "learning", "learned", and "learns" would all map to the common root "learn". This frequency corresponds to the number of times each stemmed word occurs in the document. One or more topics to which the content pertains is determined by analyzing which words occur most frequently.

When UQ engine 306 receives a work item, it compares the properties associated with the route to the work item. If a match is found between the properties associated with the route and the characteristics of the work item, then the work item is handled according to the route parameters. Although any number of properties can be defined for a route, the fewer number of properties specified, the greater the probability that a work item can be handled according to one of the routes. Also, evaluating a greater number of properties can require more of the processing resources of UQ engine 306.

In another implementation, macro substitution can be used to add power and flexibility to UQ engine 306. A delimiter, such as the percent sign (%), can be used to indicate a term whose value can be supplied or substituted with a value supplied by the administrator. For example, in the following property expression, a number of different values can be substituted for the term "% type %":

Recipient=furniture.com AND category=% type %

An administrator can specify any number of values that can be substituted for the term "% type %", such as "chair", "table", and "desk". When the category of a work item matches any of the values allowed by the administrator for the term "% type %" in the property expression, the work item is handled along the route that corresponds to the property expression.

As another example of the usefulness of the macro substitution feature is the ease of creating routing rules for agents that speak several different languages. A property expression for a route can be created as follows:

Recipient=furniture.com AND language=% language %

The agent skills can include the languages the agent is capable of speaking, such as English, French, and Spanish. When the language of a work item matches any of the language values spoken by an agent, the work item can be assigned to a route that corresponds to an agent with the required linguistic abilities.

Another feature that can be implemented to add power and flexibility to UQ engine 306 is an "agent ID virtual skill" feature. This capability results in the work item being assigned directly to the agent specified by the work item, as opposed to being placed in a queue waiting for the next available agent who has the skills to handle the work item. For example, a property expression for a route to a particular agent can be created as follows:

AgentID=% AgentID %

When a work item with "Recipient=johndoe@furniture.com" is received, the work item will be assigned to the route corresponding to the Agent_ID=johndoe.

Agent_ID=% recipient % The correct syntax is AgentID=% AgentID %

When a work item with "Recipient=johndoe@furniture.com" is received, a new property AgentID=johndoe is added to the work item's properties before it is sent to UQ system 102. When UQ system 102 receives the work item and finds a match for a route, the UQ system 102 then determines whether any of the escalation rules apply. If an escalation rule specifying AgentID=% AgentID % is found, the UQ system 102 uses the work item property to find that AgentID=johndoe to assign the work item to the agent named John Doe.

FIG. 4r is an example of an administrator's interfaces 420, 422 for entering escalation rules for a route. The information supplied via interfaces 420, 422 can be stored in the data tables shown in FIGS. 4e and 4f, as described herein. When escalations tab 408 is selected, an interface is presented that allows the administrator to enter escalation rule information for the route. The escalation rules define how a work item is handled along a particular route, and as many escalation rules as desired can be defined for each route.

In the implementation shown in FIG. 4r, selecting the escalations tab 408 invokes escalations interface 420 and escalations rules interface 422 for adding, deleting, and editing one or more escalation rules for the selected route. Escalations interface 420 allows an administrator to select or enter the name of an escalation rule, and to specify how long the escalation rule will be in effect once it is activated. The administrator can also enter the order in which the selected escalation rule is activated relative to other escalation rules that apply to the selected route.

The escalation rules interface 422 allows an administrator to combine multiple terms into one escalation rule using a language code with relational operators that are evaluated when the escalation rule(s) are applied to the corresponding route. For example, the begin group, such as single or multiple parentheses, can be entered, followed by a skill name, a relational operator, a skill item, an end group, a joinder operator, and a sequence value that allows escalation rules to be grouped together. The begin group, skills, relational operators, skill items, end group, joinder operators, and sequence values can also be selected from a pull-down list that includes the available selections defined by the administrator.

When UQ engine 306 receives a work item, it attempts to match an agent having the desired skills to handle the work item. If an agent who has the desired skills cannot be found, the next escalation rule can specify fewer, or more common skills, thus making it more likely that an agent with the reduced scope of skills can be found. Each escalation rule has a time associated with it that represents the amount of time allowed to find an agent. The time limit can be omitted for the last escalation rule so that the work item does not go unserved.

As an example, a set of escalation rules can be defined for a route as follows:

Escalation Rule #1: Allow 120 seconds to find an agent who is an expert in furniture sales and the English language. ((Language=english, Expertise=Expert) AND (Skill name=Furniture Sales, Expertise=Expert)).

Escalation Rule #2: Allow 180 seconds to find an agent who has experience with furniture sales and speaks the English language. ((Language=english, Expertise=intermediate) AND (Skill name=Furniture Sales, Expertise=intermediate)).

Escalation Rule #3: Wait until an agent is available who speaks the English language and works in the furniture department. ((Language=english, Expertise=intermediate) AND (Skill name=Furniture Department, Expertise=novice)).

Although any number of escalation rules can be defined for a route, the more specific the scope of the agent's skills specified the lesser the probability that a work item can be handled according to the escalation rule. Also, evaluating a greater number of escalation rules can require more of the processing resources of UQ engine 306.

In another implementation, macro substitution can be used to add power and flexibility to escalation rules in UQ engine 306. A delimiter, such as the percent sign (%), can be used to indicate a term whose value can be supplied or substituted with a value supplied by the administrator. For example, in the following escalation rule, a number of different values can be substituted for the term "% type %":

Skill name=furniture AND language=% type %

The same work "type" has to be in the work item property. An administrator can specify any, number of values that can be substituted for the term "% type %", such as "English", "French", and "Chinese". When the agent's language matches any of the values allowed by the administrator for the term "% type %" in the escalation rule, the work item is handled by that agent, as long as the other criteria is satisfied as well.

FIG. 4s is an example of an administrator's interface 424 for entering and editing channel information and properties. Information for each channel can be displayed and modified including the channel type, whether the channel is a primary channel and/or failure recoverable, the service level, and the service level percentage. The channel service level and service level percentage indicate the amount of time within which the given percentage of the work items need to be handled. Selecting a channel in channel window 426 causes the channel to be displayed in the uppermost line 428 of the list, which includes data entry windows for entering and modifying the selected channel's parameters.

The channel service level and service level percentage indicate the amount of time within which the given percentage of the work items need to be handled. This differs from the route service level and service level percentage since there can be multiple routes for the same media. Media statistics provide information for each media type while route statistics provide information for each route.

Administrator's interface 424 also includes properties tab 430 that can be selected to view, add, edit, and delete properties for the selected channel shown in line 428. The channel properties list is used when a route selection criteria is defined and a pick list can be provided from which the user can choose an option. Properties interface 430 is used as entries in a pick list from which the user can choose an option.

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention as set forth in the following claims.

We claim:

1. A method comprising:
    assigning a work item to a first route for response by a first agent associated with the first route; and
    assigning the work item to a second route for response by a second agent associated with the second route in accordance with a first escalation rule, if the first agent does not respond to the work item within a period of time associated with the first escalation rule, wherein the period of time is defined by a time threshold.

2. The method of claim 1 further comprising:
selecting the first escalation rule from a plurality of escalation rules associated with the first route.

3. The method of claim 2 further comprising:
performing said selecting the first escalation rule using a sequence number associated with each of the plurality of escalation rules, wherein the sequence number indicates a relative order of the plurality of escalation rules.

4. The method of claim 1 further comprising:
selecting the second route in accordance with a characteristic associated with the first escalation rule.

5. The method of claim 4 wherein the characteristic comprises a skill to respond to the work item.

6. The method of claim 5 wherein the characteristic further comprises a skill level to respond to the work item.

7. The method of claim 5, wherein
the skill associated with the second route corresponds to a skill of the second agent.

8. The method of claim 4 further comprising:
performing said selecting the second route by comparing the characteristic associated with the first escalation rule with one or more characteristics associated with one or more routes, wherein the one or more routes comprise the second route.

9. The method of claim 4 further comprising:
combining a plurality of characteristics to form the characteristic associated with the first escalation rule.

10. A tangible computer readable medium encoded with a computer program comprising:
a first set of instructions, executable by a processor, configured to assign a work item to a first route for response by a first agent associated with the first route; and
a second set of instructions, executable by the processor, configured to assign the work item to a second route for response by a second agent associated with the second route in accordance with a first escalation rule, if the first agent does not respond to the work item within a period of time associated with the first escalation rule wherein the period of time is defined by a time threshold.

11. The computer program of claim 10 further comprising:
a third set of instructions, executable by the processor, configured to select the first escalation rule from a plurality of escalation rules associated with the first route.

12. The computer program of claim 10 further comprising:
a third set of instructions, executable by the processor, configured to select the second route in accordance with a characteristic associated with the first escalation rule.

13. The computer program of claim 12 wherein the characteristic comprises a skill to respond to the work item.

14. The computer program of claim 12 wherein the third set of instructions further comprises:
a fourth set of instructions, executable by the processor, configured to compare the characteristic associated with the first escalation rule with one or more characteristics associated with one or more routes, wherein the one or more routes comprise the second route.

15. The computer program of claim 12 further comprising:
a fourth set of instructions, executable by the processor, configured to combine a plurality of characteristics to form the characteristic associated with the first escalation rule.

16. A system comprising:
means for assigning a work item to a first route for response by a first agent associated with the first route;
means for determining if the first agent does not respond to the work item within a period of time associated with the first escalation rule, wherein the period of time is defined by a time threshold; and
means, responsive to said means for determining, for assigning the work item to a second route for response by a second agent associated with the second route in accordance with a first escalation rule.

17. The system of claim 16 further comprising:
means for selecting the first escalation rule from a plurality of escalation rules associated with the first route.

18. The system of claim 16 further comprising:
means for selecting the second route in accordance with a characteristic associated with the first escalation rule.

19. The system of claim 18 further comprising:
means for comparing the characteristic associated with the first escalation rule with one or more characteristics associated with one or more routes, wherein
the one or more routes comprise the second route.

20. The system of claim 18 further comprising:
means for combining a plurality of characteristics to form the characteristic associated with the first escalation rule.

* * * * *

UNITED STATES PATENT AND TRADEMARK OFFICE
CERTIFICATE OF CORRECTION

PATENT NO. : 7,308,093 B2
APPLICATION NO. : 11/515604
DATED : December 11, 2007
INVENTOR(S) : Annadata et al.

It is certified that error appears in the above-identified patent and that said Letters Patent is hereby corrected as shown below:

On page 2, under "U.S. Patent Documents", in column 1, line 25, delete "371/233" and insert -- 382/233 --, therefor.

On sheet 6 of 20, in Fig. 2 of 2, line 4, after "MEDIA" delete "SATUS" and insert -- STATUS --, therefor.

In column 1, line 33, delete "independent" and insert -- Independent --, therefor.

In column 1, line 34, delete "Field" and insert -- field --, therefor.

In column 1, line 45, delete "each" and insert -- Each --, therefor.

In column 7, line 3, after "Queuing."" delete ".".

In column 7, line 34, after "Queuing."" delete ".".

In column 8, line 44, delete "successful.UQAssign" and insert -- successful. UQAssign --, therefor.

In column 9, line 32, delete "AgentLogic," and insert -- AgentLogin, --, therefor.

In column 9, line 36, delete "AgentSkil" and insert -- AgentSkill --, therefor.

In column 13, line 62, delete "example." and insert -- example, --, therefor.

In column 17, line 2, delete "queing" and insert -- queuing --, therefor.

In column 18, line 2, delete "workitems" and insert -- work items --, therefor.

In column 18, line 28, delete "transferree" and insert -- transferee --, therefor.

In column 19, line 25, delete "workitem" and insert -- work item --, therefor.

In column 19, line 30, delete "critiera" and insert -- criteria --, therefor,

In column 19, line 32, delete "ReceivierAddress" and insert -- ReceiverAddress --, therefor.

UNITED STATES PATENT AND TRADEMARK OFFICE
CERTIFICATE OF CORRECTION

PATENT NO.       : 7,308,093 B2
APPLICATION NO.  : 11/515604
DATED            : December 11, 2007
INVENTOR(S)      : Annadata et al.

It is certified that error appears in the above-identified patent and that said Letters Patent is hereby corrected as shown below:

In column 20, line 22, delete "example." and insert -- example, --, therefor.

In column 20, line 38, delete "FIG. 41" and insert -- FIG. 4I --, therefor.

In column 23, line 64, delete "any," and insert -- any --, therefor.

In column 25, line 42, in Claim 10, after "rule" insert - - , --.

Signed and Sealed this

Second Day of September, 2008

JON W. DUDAS
*Director of the United States Patent and Trademark Office*